United States Patent
Yanagihara et al.

(10) Patent No.: US 10,559,810 B2
(45) Date of Patent: Feb. 11, 2020

(54) POSITIVE ELECTRODE ACTIVE MATERIAL, POSITIVE ELECTRODE, BATTERY, BATTERY PACK, ELECTRONIC DEVICE, ELECTRIC VEHICLE, POWER STORAGE DEVICE, AND POWER SYSTEM

(71) Applicant: Murata Manufacturing Co., Ltd., Kyoto (JP)

(72) Inventors: Asuki Yanagihara, Fukushima (JP); Shingo Nakasato, Fukushima (JP); Yuki Niwata, Fukushima (JP); Yosuke Hosoya, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 57 days.

(21) Appl. No.: 15/324,924

(22) PCT Filed: Jul. 9, 2015

(86) PCT No.: PCT/JP2015/003465
§ 371 (c)(1),
(2) Date: Jan. 9, 2017

(87) PCT Pub. No.: WO2016/017077
PCT Pub. Date: Feb. 4, 2016

(65) Prior Publication Data
US 2017/0207444 A1  Jul. 20, 2017

(30) Foreign Application Priority Data
Jul. 31, 2014  (JP) .................................. 2014-157040

(51) Int. Cl.
*H01M 4/131* (2010.01)
*C01G 53/00* (2006.01)
(Continued)

(52) U.S. Cl.
CPC ............... *H01M 4/131* (2013.01); *B60K 6/46* (2013.01); *C01B 25/12* (2013.01); *C01B 25/30* (2013.01);
(Continued)

(58) Field of Classification Search
CPC .. B60K 6/46; B60K 6/48; B60L 53/16; B60L 58/10; B60L 11/1818; B60L 11/1851;
(Continued)

(56) References Cited

U.S. PATENT DOCUMENTS

2010/0090524 A1* 4/2010 Obayashi ............ B60L 11/1816
307/9.1
2010/0143802 A1  6/2010 Takei
(Continued)

FOREIGN PATENT DOCUMENTS

CN  101678775  3/2010
CN  101997113  3/2011
(Continued)

OTHER PUBLICATIONS

Chen et al., Staging Phase Transitions in LixCoO2, Journal of The Electrochemical Society, 149(12), Oct. 29, 2002, pp. A1604-A1609.
(Continued)

*Primary Examiner* — Lingwen R Zeng
(74) *Attorney, Agent, or Firm* — K&L Gates LLP

(57) ABSTRACT

A positive electrode active material includes: a particle including a lithium composite oxide; a first layer that is provided on a surface of the particle and includes a lithium composite oxide; and a second layer that is provided on a surface of the first layer. The lithium composite oxide included in the particle and the lithium composite oxide included in the first layer have the same composition or almost the same composition, the second layer includes an oxide or a fluoride, and the lithium composite oxide included
(Continued)

in the first layer has lower crystallinity than the lithium composite oxide included in the particle.

16 Claims, 14 Drawing Sheets

(51) Int. Cl.

| | | |
|---|---|---|
| *C01F 7/02* | (2006.01) | |
| *C01F 5/02* | (2006.01) | |
| *C01G 53/04* | (2006.01) | |
| *C01G 45/02* | (2006.01) | |
| *C01G 25/02* | (2006.01) | |
| *C01G 23/047* | (2006.01) | |
| *C01B 35/10* | (2006.01) | |
| *C01G 41/02* | (2006.01) | |
| *C01B 25/12* | (2006.01) | |
| *C01D 15/04* | (2006.01) | |
| *C01G 45/12* | (2006.01) | |
| *C01B 25/45* | (2006.01) | |
| *C01G 23/00* | (2006.01) | |
| *C01B 25/30* | (2006.01) | |
| *C01F 5/28* | (2006.01) | |
| *H01M 4/525* | (2010.01) | |
| *H01M 4/505* | (2010.01) | |
| *H01M 4/36* | (2006.01) | |
| *H01M 4/48* | (2010.01) | |
| *B60K 6/46* | (2007.10) | |
| *C01G 51/00* | (2006.01) | |
| *H01M 2/16* | (2006.01) | |
| *H01M 4/133* | (2010.01) | |
| *H01M 4/50* | (2010.01) | |
| *H01M 4/52* | (2010.01) | |
| *H01M 4/58* | (2010.01) | |
| *H01M 4/587* | (2010.01) | |
| *H01M 4/62* | (2006.01) | |
| *H01M 4/66* | (2006.01) | |
| *H01M 10/0525* | (2010.01) | |
| *H01M 10/0568* | (2010.01) | |
| *H01M 10/0569* | (2010.01) | |
| *H01M 10/42* | (2006.01) | |
| *B60K 6/48* | (2007.10) | |
| *H01M 4/02* | (2006.01) | |

(52) U.S. Cl.
CPC .......... *C01B 25/45* (2013.01); *C01B 35/1027* (2013.01); *C01D 15/04* (2013.01); *C01F 5/02* (2013.01); *C01F 5/28* (2013.01); *C01F 7/02* (2013.01); *C01G 23/005* (2013.01); *C01G 23/047* (2013.01); *C01G 25/02* (2013.01); *C01G 41/02* (2013.01); *C01G 45/02* (2013.01); *C01G 45/1242* (2013.01); *C01G 51/42* (2013.01); *C01G 53/04* (2013.01); *C01G 53/50* (2013.01); *H01M 2/1653* (2013.01); *H01M 4/133* (2013.01); *H01M 4/366* (2013.01); *H01M 4/483* (2013.01); *H01M 4/502* (2013.01); *H01M 4/505* (2013.01); *H01M 4/523* (2013.01); *H01M 4/525* (2013.01); *H01M 4/587* (2013.01); *H01M 4/5825* (2013.01); *H01M 4/623* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 10/425* (2013.01); *B60K 6/48* (2013.01); *C01P 2004/82* (2013.01); *C01P 2006/40* (2013.01); *H01M 2004/027* (2013.01); *H01M 2004/028* (2013.01); *H01M 2220/20* (2013.01); *H01M 2220/30* (2013.01); *H01M 2300/0037* (2013.01)

(58) Field of Classification Search
CPC ......... C01B 25/12; C01B 25/30; C01B 25/45; C01B 35/1027; C01D 15/04; C01F 5/02; C01F 5/28; C01F 7/02; C01G 23/005; C01G 23/047; C01G 25/02; C01G 41/02; C01G 45/02; C01G 45/1242; C01G 51/42; C01G 51/50; C01G 51/66; C01G 53/04; C01G 53/42; C01G 53/50; C01P 2002/54; C01P 2002/82; C01P 2004/82; C01P 2004/84; C01P 2006/40; H01M 10/0525; H01M 10/0568; H01M 10/0569; H01M 10/425; H01M 2004/027; H01M 2004/028; H01M 2220/20; H01M 2220/30; H01M 2300/0037; H01M 2/1653; H01M 4/131; H01M 4/133; H01M 4/366; H01M 4/483; H01M 4/502; H01M 4/505; H01M 4/523; H01M 4/525; H01M 4/5825; H01M 4/587; H01M 4/623; H01M 4/625; H01M 4/661; Y02E 60/122; Y02T 10/7011

See application file for complete search history.

(56) References Cited

U.S. PATENT DOCUMENTS

| | | | |
|---|---|---|---|
| 2010/0193730 A1 | 8/2010 | Yamamura | |
| 2015/0364756 A1* | 12/2015 | Kim | H01M 4/366 |
| | | | 429/223 |

FOREIGN PATENT DOCUMENTS

| | | |
|---|---|---|
| CN | 103296249 | 9/2013 |
| JP | H05-021066 A | 1/1993 |
| JP | H10-144291 A | 5/1998 |
| JP | 2005-524204 A | 8/2005 |
| JP | 2005-336000 A | 12/2005 |
| JP | 2009-081103 A | 4/2009 |
| JP | 2010-135207 A | 6/2010 |
| JP | 2010-177042 A | 8/2010 |
| JP | 2013-026038 A | 2/2013 |
| JP | 2013-218787 A | 10/2013 |
| KR | 10-2006-0109305 | 10/2006 |
| KR | 10-2009-0115140 | 11/2009 |

OTHER PUBLICATIONS

International Search Report (with English translation) dated Oct. 6, 2015 in corresponding international application No. PCT/JP2015/003465 (5 pages).

Written Opinion dated Oct. 6, 2015 in corresponding international application No. PCT/JP2015/003465 (4 pages).

Chinese Office Action for corresponding Chinese Application No. 201580040839.0, dated Nov. 28, 2018; (6 pages).

Chinese Search Report for corresponding Chinese Application No. 201580040839.0, dated Nov. 20, 2018; (3 pages).

Chinese Office Action dated May 21, 2019 in corresponding Chinese Application No. 201580040839.0.

Korean Office Action dated Dec. 5, 2019 in corresponding Korean Application No. 10-2017-7000991.

* cited by examiner

FIG.1
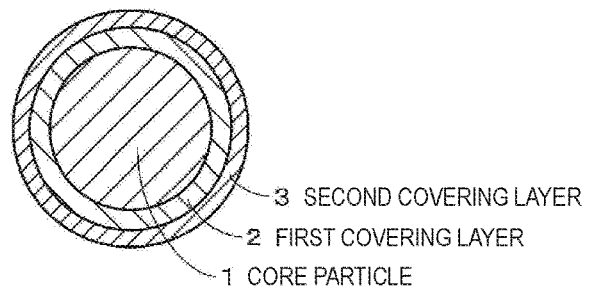
FIG.2
A
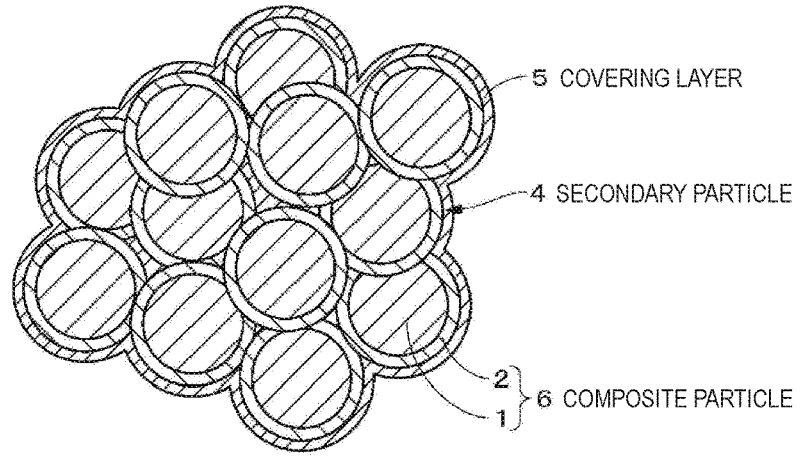
B
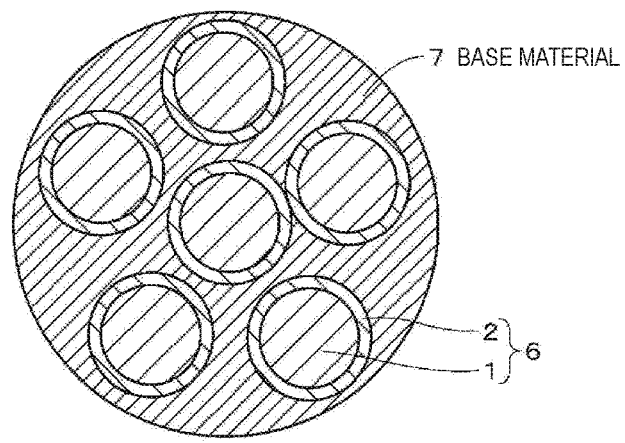

POSITIVE ELECTRODE ACTIVE MATERIAL, POSITIVE ELECTRODE, BATTERY, BATTERY PACK, ELECTRONIC DEVICE, ELECTRIC VEHICLE, POWER STORAGE DEVICE, AND POWER SYSTEM

CROSS-REFERENCE TO RELATED APPLICATIONS

The present application claims the benefit of International Application No. PCT/JP2015/003465, filed Jul. 9, 2015, which claims priority to Japanese Application No. 2014-157040, filed Jul. 31, 2014, the disclosures of which are incorporated herein by reference.

BACKGROUND

The present technology relates to a positive electrode active material and a positive electrode, a battery, a battery pack, an electronic device, an electric vehicle, a power storage device, and a power system including the same, and specifically, to a positive electrode active material including a lithium composite oxide.

A positive electrode active material having an $\alpha$-NaFeO$_2$ structure such as a lithium cobalt oxide and a lithium nickelate can increase a chargeable and dischargeable capacity by increasing a charging voltage. However, when a battery is used in a high charging voltage region, an unintentional Li insertion and separation reaction of the positive electrode active material occurs due to a locally higher potential state.

According to Non-Patent Literature 1, when charging and discharging are performed at a high potential, Li insertion and separation that are necessary for crystalline phase transition are used. A reversible reaction of a Li insertion and separation reaction necessary for the phase transition is difficult and unstable, and causes capacity deterioration when a part of a positive electrode is exposed to a high potential according to a local potential distribution.

Patent Literature 1 discloses a technology for improving a cycle characteristic using an amorphous LiCoO$_2$ as a positive electrode active material. However, in this method, it is not possible to use Li insertion and separation necessary for crystalline phase transition and a capacity significantly decreases. In addition, many side reactions occur at a high potential and particularly elution of a metal such as Co occurs frequently.

Patent Literatures 2 and 3 disclose technologies for reducing a movement resistance of lithium ions between positive electrode powders and improving a cycle characteristic by covering at least a part of a surface of a powder body with an amorphous lithium transition metal oxide. However, in these methods, while a movement resistance of lithium ions can be reduced, since it is not possible to ensure reversibility of crystalline phase transition, a capacity decreases when a battery is used at a high potential. In addition, many side reactions occur at a high potential and particularly elution of a metal such as Co occurs frequently.

CITATION LIST

Patent Literature

Patent Literature 1 JP H05-021066A
Patent Literature 2 JP 2010-177042A
Patent Literature 3 JP 2005-524204T

Non-Patent Literature

Non-Patent Literature 1: Journal of The Electrochemical Society, 149 (12) A1604-A1609 (2002)

SUMMARY

Technical Problem

Accordingly, an object of the present technology is to provide a positive electrode active material having a high capacity and an excellent cycle characteristic, and a positive electrode, a battery, a battery pack, an electronic device, an electric vehicle, a power storage device, and a power system including the same.

Solution to Problem

In order to solve the problem, a first technology is a positive electrode active material including:
 a particle including a lithium composite oxide;
 a first layer that is provided on a surface of the particle and includes a lithium composite oxide; and
 a second layer that is provided on a surface of the first layer.
 The lithium composite oxide included in the particle and the lithium composite oxide included in the first layer have the same composition or almost the same composition,
 the second layer includes an oxide or a fluoride, and
 the lithium composite oxide included in the first layer has lower crystallinity than the lithium composite oxide included in the particle.

A second technology is a positive electrode including:
 a positive electrode active material that includes
 a particle including a lithium composite oxide,
 a first layer that is provided on a surface of the particle and includes a lithium composite oxide, and
 a second layer that is provided on a surface of the first layer.
 The lithium composite oxide included in the particle and the lithium composite oxide included in the first layer have the same composition or almost the same composition,
 the second layer includes an oxide or a fluoride, and
 the lithium composite oxide included in the first layer has lower crystallinity than the lithium composite oxide included in the particle.

A third technology is a battery including:
 a positive electrode including a positive electrode active material;
 a negative electrode; and
 an electrolyte,
 The positive electrode active material includes
 a particle including a lithium composite oxide,
 a first layer that is provided on a surface of the particle and includes a lithium composite oxide, and
 a second layer that is provided on a surface of the first layer.
 The lithium composite oxide included in the particle and the lithium composite oxide included in the first layer have the same composition or almost the same composition,
 the second layer includes an oxide or a fluoride, and
 the lithium composite oxide included in the first layer has lower crystallinity than the lithium composite oxide included in the particle.

A fourth technology is a battery pack including the battery according to the third technology.

A fifth technology is an electronic device including the battery according to the third technology. The electronic device receives power supply from the battery.

A sixth technology is an electric vehicle including: the battery according to the third technology; a conversion device configured to perform conversion into driving power of the vehicle upon reception of power supply from the battery; and a control device configured to perform information processing regarding vehicle control based on information regarding the battery.

A seventh technology is a power storage device including the battery according to the third technology. The power storage device supplies power to an electronic device connected to the battery.

An eighth technology is a power system including the battery according to the third technology. The power system receives power supply from the battery, or allows power to be supplied to the battery from a power generation apparatus or a power network.

Advantageous Effects of Invention

As described above, according to the present technology, it is possible to obtain a high capacity and an excellent cycle characteristic.

BRIEF DESCRIPTION OF DRAWINGS

FIG. 1 is a pattern diagram showing a configuration example of a positive electrode active material according to a first embodiment of the present technology.

FIG. 2A is a pattern diagram showing a configuration example of a positive electrode active material according to a first modified example of the first embodiment of the present technology. FIG. 2A is a pattern diagram showing a configuration example of a positive electrode active material according to a second modified example of the first embodiment of the present technology.

DETAILED DESCRIPTION

Figure 3:
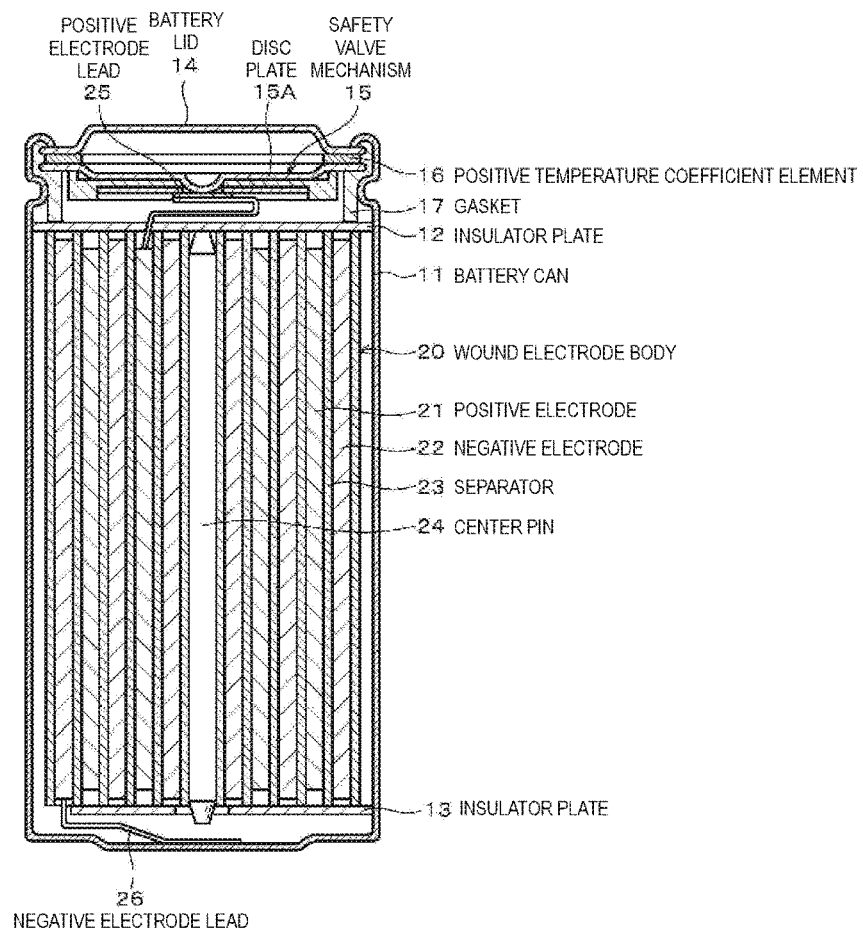
FIG. 3 is a cross-sectional view showing a configuration example of a non-aqueous electrolyte secondary battery according to a second embodiment of the present technology.

Embodiments of the present technology will be described in the following order.
1. First embodiment (example of positive electrode active material)
2. Second embodiment (example of cylindrical battery)
3. Third embodiment (example of flat battery)
4. Fourth embodiment (example of stacked battery)
5. Fifth embodiment (examples of battery pack and electronic device)
6. Sixth embodiment (example of power storage system)
7. Seventh embodiment (example of electric vehicle)

1. First Embodiment

[Configuration of Positive Electrode Active Material]

A positive electrode active material according to a first embodiment includes 2-layer-covered composite particle powder. The positive electrode active material may further include other particle powders in addition to the 2-layer-covered composite particle powder as necessary. As shown in FIG. 1, the 2-layer-covered composite particle includes a core particle 1, a first covering layer 2 that is provided on a surface of the core particle 1, and a second covering layer 3 that is provided on a surface of the first covering layer 2.

(Core Particle)

The core particle 1 includes, for example, a globe form, an ellipsoid form, a needle form, a plate form, a scale form, a tube form, a wire form, a stick form (rod form), an indeterminate form and the like, whereas they are not limited to these particularly. In addition, two or more kinds of particles with the above-mentioned forms may be combined to be used. Herein, the globe form includes not only a spherical form but also a form which is slightly flat or distorted compared with the strict spherical form, a form which is obtained by forming unevenness on the surface of the strict spherical form, a form obtained by combining any of these forms, and the like. The ellipsoid form includes not only a strict ellipsoid form but also a form which is slightly flat or distorted compared with the strict ellipsoid form, a form which is obtained by forming unevenness on the surface of the strict ellipsoid form, a form obtained by combining any of these forms, and the like.

The core particles 1 include a lithium composite oxide. As the lithium composite oxide, a high crystalline lithium composite oxide is preferable. A composite oxide in such a state is, for example, a crystalline material or a mixture of a crystalline material and an amorphous material. Here, the crystalline material includes not only a monocrystalline material but also a polycrystalline material including a set of a plurality of crystal particles. The lithium composite oxide is a positive electrode material that can intercalate and deintercalate lithium ions. As such a positive electrode material, in order to increase an energy density, a lithium transition metal composite oxide including lithium, one or two or more transition metal elements, and oxygen (O) is preferable. As such a lithium transition metal composite oxide, a lithium transition metal composite oxide that uses a Li insertion and separation reaction due to crystalline phase transition is preferable. This is because an effect which enables a cycle characteristic to be improved is particularly noticeably exhibited. As the lithium transition metal composite oxide that uses a Li insertion and separation reaction, a lithium composite oxide having a layered rock salt structure, a lithium composite phosphate having an olivine-type structure, and a lithium-manganese composite oxide having a spinel type structure can be used. Among such lithium transition metal composite oxides, the lithium composite oxide having a layered rock salt structure is particularly preferably used. This is because it can increase a chargeable and dischargeable capacity by increasing a charging voltage.

As the lithium composite oxide having a layered rock salt structure, for example, a lithium composite oxide having an average composition represented by the following expression (A) or expression (B) is used.

$$Li_wM_xN_yO_{2-z}X_z \quad (A)$$

(Here, w is 0.8<w<1.2, x+y is 0.9<x+y<1.1, y is 0≤y<0.1, and z is 0≤z<0.05. M is at least one of Ti, V, Cr, Mn, Fe, Co, Ni, Mn and Cu. N is at least one of Na, Mg, Al, Si, K, Ca, Zn, Ga, Sr, Y, Zr, Nb, Mo, Ba, La, W and Bi. X is at least one of F, Cl and S. In addition, a composition of lithium varies according to a charging and discharging state. A value of w represents a value in a completely discharged state.)

$$Li_xCo_{1-y}M_yO_{2-z}X_z \quad (B)$$

(Here, x is 0.8<x<1.2, y is 0≤y<0.15, and z is 0≤z<0.05. M is at least one of Ti, V, Cr, Mn, Fe, Ni, Mn, Cu, Na, Mg, Al, Si, K, Ca, Zn, Ga, Sr, Y, Zr, Nb, Mo, Ba, La and W. X is at least one of F, Cl and S. In addition, a composition of lithium varies according to a charging and discharging state. A value of x represents a value in a completely discharged state.)

As the lithium composite phosphate having an olivine-type structure, for example, a lithium composite phosphate having an average composition represented by the following expression (C) or expression (D) is used.

$$Li_aM1_bPO_4 \quad (C)$$

(Here, M1 is at least one selected from among elements of Group 2 to Group 15. a and b are values within ranges of 0≤a≤2.0 and 0.5≤b≤2.0. In addition, a composition of lithium varies according to a charging and discharging state. A value of a represents a value in a completely discharged state.)

$$Li_zM2PO_4 \quad (D)$$

(Here, M2 is at least one of Co, Mn, Fe, Ni, Mg, Al, B, Ti, V, Nb, Cu, Zn, Mo, Ca, Sr, W and Zr. z is a value within a range of 0.9≤z≤1.1. In addition, a composition of lithium varies according to a charging and discharging state. A value of z represents a value in a completely discharged state.)

As the lithium-manganese composite oxide having a spinel type structure, for example, a lithium-manganese composite oxide having an average composition represented by the following expression (E) is used.

$$Li_vMn_{2-w}M3_wO_xF_y \quad (E)$$

(Here, M3 is at least one of Co, Ni, Mg, Al, B, Ti, V, Cr, Fe, Cu, Zn, Mo, Sn, Ca, Sr and W. v, w, x and y are values within ranges of 0.9≤v≤1.1, 0≤w≤0.6, 3.7≤x≤4.1, and 0≤y≤0.1. In addition, a composition of lithium varies according to a charging and discharging state. A value of v represents a value in a completely discharged state.)

(First Covering Layer)

The first covering layer 2 covers at least a part of surfaces of the core particles 1. Specifically, the first covering layer 2 may partially cover surfaces of the core particles 1 or may cover the entire surfaces of the core particles 1. However, in order to improve a cycle characteristic, the entire surfaces of the core particles 1 are preferably covered. At an interface between the core particles 1 and the first covering layer 2, compositions and states of both components may be discontinuously changed or continuously changed.

The first covering layer 2 includes a lithium composite oxide. As the lithium composite oxide, a low crystalline lithium composite oxide is preferable. A composite oxide in such a state is, for example, a mixture of a crystalline material and an amorphous material or an amorphous material. Here, the crystalline material includes not only a monocrystalline material but also a polycrystalline material including a set of a plurality of crystal particles. The lithium composite oxide included in the core particles 1 and the lithium composite oxide included in the first covering layer 2 have the same composition or almost the same composition. Here, the same composition means that the lithium composite oxides included in the core particles 1 and the first covering layer 2 have the same constituent elements, and the constituent elements of the core particles 1 and the first covering layer 2 have the same atomic ratios. In addition, almost the same composition means that the lithium composite oxides included in the core particles 1 and the first covering layer 2 have the same constituent elements and the constituent elements of the core particles 1 and the first covering layer 2 have atomic ratios that differ within an extent in which crystalline phase transition reactions when Li insertion and separation reactions of the lithium composite oxides included in the core particles 1 and the first covering layer 2 occur are the same. In order to obtain the same phase transition reactions when Li insertion and separation reactions of the lithium composite oxides included in the core particles 1 and the first covering layer 2 occur, a difference between the atomic ratios of the constituent elements of the core particles 1 and the first covering layer 2 is preferably within 10 atom % and more preferably within 3 atom %.

Crystallinity of the lithium composite oxide included in the first covering layer 2 is lower than crystallinity of the lithium composite oxide included in the core particles 1. In this case, specifically, the lithium composite oxides included in the core particles 1 and the first covering layer 2 are preferably in the following states. That is, (a) the lithium composite oxide included in the core particles 1 is a crystalline material and the lithium composite oxide included in the first covering layer 2 is an amorphous material, (b) the lithium composite oxide included in the core particles 1 is a crystalline material and the lithium composite oxide included in the first covering layer 2 is a mixture of a crystalline material and an amorphous material, or (c) both the lithium composite oxide included in the core particles 1 and the lithium composite oxides included in the first covering layer 2 are a mixture of a crystalline material and an amorphous material, and an amount of a crystalline material included in the core particles 1 is preferably greater than an amount of a crystalline material included in the first covering layer 2. Here, the crystalline material includes not only a monocrystalline material but also a polycrystalline material including a set of a plurality of crystal particles.

Determination of whether the lithium composite oxide included in the first covering layer 2 has lower crystallinity than the lithium composite oxide included in the core particles 1 can be confirmed using, for example, a cross-sectional transmission electron microscope (TEM) image of the 2-layer-covered composite particle or through Raman spectroscopy. Specifically, it can be confirmed by analyzing a peak intensity ratio E/A between an intensity A of a peak in a range of 550 cm$^{-1}$ or more and 650 cm$^{-1}$ or less and an intensity E of a peak in a range of 450 cm$^{-1}$ or more and 500 cm$^{-1}$ or less in Raman spectra of the positive electrode active material.

In the Raman spectra, the peak intensity A is caused by vibration of Co—O in a direction parallel to a c axis and the peak intensity E is caused by vibration in a direction parallel to a Li layer. The peak intensity E that is lower than the peak intensity A is considered to show low crystallinity of a surface that can be detected through Raman spectroscopy (refer to C. Julien/Solid State Ionics 157 (2003) 57 to 71).

In the Raman spectra of the positive electrode active material, the peak intensity ratio E/A between an intensity A of a peak in a range of 550 cm$^{-1}$ or more and 650 cm$^{-1}$ or less and an intensity E of a peak in a range of 450 cm$^{-1}$ or more and 500 cm$^{-1}$ or less preferably satisfies a relation represented by the following expression (1).

$$0.1 \leq E/A \leq 0.35 \tag{1}$$

When E/A<0.1 is satisfied, since the core particles 1 have low crystallinity, metal elution from the core particles 1 increases due to solid phase diffusion, a cycle characteristic deteriorates. On the other hand, when 0.35<E/A is satisfied, since the first covering layer 2 has high crystallinity, it is not possible to mitigate distortion of lattices and crystallites within the core particles 1 occurring due to a Li insertion and separation reaction necessary for phase transition, and a cycle characteristic deteriorates.

When the lithium composite oxides included in the core particle 1 and the first covering layer 2 have almost the same composition, a lithium content of the lithium composite oxide included in the first covering layer 2 is preferably lower than a lithium content of the lithium composite oxide included in the core particle 1. This is because it is easy to set the lithium composite oxide included in the first covering layer 2 to have lower crystallinity than the lithium composite oxide included in the core particle 1.

As described above, when the lithium composite oxides included in the core particle 1 and the first covering layer 2 have the same composition or almost the same composition, and the lithium composite oxide included in the first covering layer 2 is set to have lower crystallinity than the lithium composite oxide included in the core particle 1, the following advantages are obtained. That is, distortion of lattices and crystallites within the core particle 1 occurring due to a Li insertion and separation reaction necessary for phase transition can be mitigated by the first covering layer 2. Accordingly, it is possible to improve reversibility of a phase transition reaction in the core particle 1 and obtain a favorable cycle characteristic.

An average film thickness of the first covering layer 2 is preferably 1 nm or more and 50 nm or less. When the average film thickness is 1 nm or more, it is possible to increase uniformity of a film thickness of the first covering layer 2, and it is possible to further improve reversibility of phase transition. Therefore, it is possible to further improve a cycle characteristic. When the average film thickness is 50 nm or less, since a covering amount of the first covering layer 2 including a low crystalline lithium composite oxide can be reduced, it is possible to reduce an amount of metal elution from the first covering layer 2 into an electrolyte solution. Accordingly, it is possible to further improve a cycle characteristic.

(Second Covering Layer)

The second covering layer 3 covers at least a part of a surface of the first covering layer 2. Specifically, the second covering layer 3 may partially cover a surface of the first covering layer 2 or may cover the entire surface of the first covering layer 2. However, in order to improve a cycle characteristic, the entire surface of the first covering layer 2 is preferably covered. At an interface between the first covering layer 2 and the second covering layer 3, compositions and states of both layers may be discontinuously changed or may be continuously changed. When a portion of the surface of the core particle 1 is not covered by the first covering layer 2 but is exposed, the exposed portion may be directly covered by the second covering layer 3.

When at least a part of the surface of the first covering layer 2 is covered by the second covering layer 3, it is possible to suppress the first covering layer 2 and the electrolyte solution from coming in contact with each other. Accordingly, it is possible to suppress metal elution from the 2-layer-covered composite particle into the electrolyte solution, and improve a cycle characteristic.

The second covering layer 3 includes, for example, an oxide or a fluoride. Oxides and fluorides having crystallinity are preferable. The oxide may be, for example, an oxide that is different from or the same oxide as the lithium composite oxide included in the core particles 1. The oxide includes, for example, at least one of Li, Ti, V, Cr, Mn, Fe, Co, Ni, Mn, Cu, Na, Mg, Al, Si, K, Ca, Zn, Ga, Sr, Y, Zr, Nb, Mo, Ba, La, W, Bi, P and B.

The oxide is, for example, a single oxide, a composite oxide such as a lithium composite oxide or a composite oxide substituted with fluorine. Examples of the single oxide include an oxide including one of the materials. Examples of the composite oxide include an oxide including two or more of the materials. Examples of the composite oxide substituted with fluorine include a composite oxide that includes two or more of the materials and that is substituted with fluorine.

As the lithium composite oxide included in the second covering layer 3, for example, a lithium transition metal composite oxide including lithium, one or two or more transition metal elements, and oxygen (O) can be used. As the lithium transition metal composite oxide, for example, a lithium transition metal composite oxide having an average composition represented by the following expression (F) is used.

$$Li_wM_xN_yO_{2-z}X_z \tag{F}$$

(Here, w is 0.8<w<1.2, x+y is 0.9<x+y<1.1, y is 0≤y<0.1, and z is 0≤z<0.05. M is at least one of Ti, V, Cr, Mn, Fe, Co, Ni, Mn and Cu. N is at least one of Na, Mg, Al, Si, K, Ca, Zn, Ga, Sr, Y, Zr, Nb, Mo, Ba, La, W and Bi. X is at least one of F, Cl and S.)

The fluoride includes, for example, at least one of Li, Ti, V, Cr, Mn, Fe, Co, Ni, Mn, Cu, Na, Mg, Al, Si, K, Ca, Zn, Ga, Sr, Y, Zr, Nb, Mo, Ba, La, W, Bi, P and B. The fluoride may be, for example, a composite fluoride. As the composite fluoride, for example, a composite fluoride including two or more of the materials is used.

A ratio of the second covering layer 3 with respect to a total amount of the core particle 1, the first covering layer 2, and the second covering layer 3 is preferably 0.1 mol % or more and 10 mol % or less. When a ratio of the second covering layer 3 is 0.1 mol or more, it is possible to suppress formation of a portion of the surface of the first covering layer 2 that is not covered by the second covering layer 3 but is exposed. Accordingly, since it is possible to suppress the first covering layer 2 and the electrolyte solution from coming in contact with each other, it is possible to further improve a cycle characteristic. When a ratio of the second covering layer 3 exceeds 10 mol %, there is a risk of a discharge and discharge capacity decreasing according to a covering form. In addition, even if a covering form contributes to charging and discharging, this is not preferable since there is a large difference in a charge and discharge curve shape.

When the second covering layer 3 includes a transition metal oxide such as the lithium transition metal composite oxide, a transition metal oxide having high crystallinity is preferable. The transition metal oxide in such a state is, for example, a crystalline material or a mixture of a crystalline material and an amorphous material. When the transition metal oxide has high crystallinity, it is possible to further suppress metal elution from the second covering layer 3 into the electrolyte solution than when the transition metal oxide has low crystallinity. When both of the first and second covering layers 2 and 3 include a transition metal oxide such as a lithium transition metal composite oxide, in order to suppress metal elution into the electrolyte solution, the transition metal oxide included in the second covering layer 3 preferably has higher crystallinity than the transition metal oxide included in the first covering layer 2. When the second covering layer 3 includes an oxide or a fluoride other than one of a transition metal oxide, a favorable effect of suppressing metal elution is obtained regardless of high or low crystallinity of the oxide or the fluoride.

[Method of Manufacturing Positive Electrode Active Material]

(Process of Preparing Single-Layer-Covered Composite Particle Powder)

First, high crystalline core particle powder and low crystalline first covering material powder are formulated, the formulation undergoes mechanical composite processing such as mechanical alloying, and a surface of the core particle 1 is covered with a first covering material. Thus, a single-layer-covered composite particle including the core particle 1 and the first covering layer 2 is obtained.

(Process of Preparing 2-Layer-Covered Composite Particle Powder)

Next, the obtained single-layer-covered composite particle powder and powder of a second covering material are formulated, the formulation undergoes mechanical composite processing such as mechanical alloying, and a surface of the first covering layer 2 is covered with the second covering material. Thus, the 2-layer-covered composite particle including the core particle 1, the first covering layer 2, and the second covering layer 3 is obtained. In this manner, a target positive electrode active material is obtained.

[Effects]

According to the positive electrode active material of the first embodiment, the first covering layer 2 is provided on a surface of the core particle 1, and the lithium composite oxides included in the core particle 1 and the first covering layer 2 have the same composition or almost the same composition. In addition, crystallinity of the lithium composite oxide included in the first covering layer 2 is lower than crystallinity of the lithium composite oxide included in the core particle 1. Accordingly, it is possible to mitigate distortion of lattices and crystallites within the core particle 1 occurring due to a Li insertion and separation reaction necessary for phase transition by the low crystalline first covering layer 2. Accordingly, it is possible to improve reversibility of a phase transition reaction in the core particle 1.

In addition, when the surface of the first covering layer 2 is protected by the second covering layer 3, it is possible to suppress the first covering layer 2 including a low crystalline lithium composite oxide and the electrolyte solution from coming in contact with each other. Accordingly, it is possible to suppress metal elution from the 2-layer-covered covering particle into the electrolyte solution. Therefore, it is possible to produce a battery having an excellent cycle characteristic.

Modified Examples

While an example in which the positive electrode active material includes the 2-layer-covered composite particle (composite primary particle) powder has been described in the first embodiment, the configuration of the positive electrode active material is not limited to this example. For example, the positive electrode active material may include a covered composite secondary particle in place of the 2-layer-covered composite particle powder, or may include a covered composite secondary particle together with the 2-layer-covered composite particle powder.

As shown in FIG. 2A, the covered composite secondary particle includes a secondary particle 4 and a covering layer 5 that is provided on a surface of the secondary particle 4. Also, in the modified example, the same portions as in the first embodiment are denoted with the same reference signs, and descriptions thereof will be omitted.

The secondary particle 4 includes a plurality of aggregated single-layer-covered composite particles 6. The covering layer 5 may partially cover a surface of the secondary particle 4 or may cover the entire surface of the secondary particle 4. However, in order to improve a cycle characteristic, the entire surface of the secondary particle 4 is preferably covered. A material of the covering layer 5 is the same as that of the second covering layer 3 in the above-described first embodiment.

In addition, the positive electrode active material may include dispersed composite particle powder in place of the 2-layer-covered composite particle powder, and may include dispersed composite particle powder together with the 2-layer-covered composite particle powder.

As shown in FIG. 2B, the dispersed composite particle includes a base material 7, and a plurality of single-layer-covered composite particles 6 that are dispersed in the base material 7. In addition, in the modified example, the same portions as those in the first embodiment are denoted by the same reference signs and the descriptions thereof will be omitted. A substance of the base material 7 is the same as that of the second covering layer 3 in the above-described first embodiment.

In addition, while an example in which the first and second covering layers are formed on surfaces of core particles by mechanical composite processing such as mechanical alloying has been described in the above-described first embodiment, a covering method is not limited thereto. For example, sol-gel method, a chemical vapor deposition (CVD) method, and a physical vapor deposition (PVD) method may be used.

2. Second Embodiment

[Configuration of Battery]

Hereinafter, a configuration example of a non-aqueous electrolyte secondary battery according to a second embodiment of the present technology will be described with reference to FIG. 3. The non-aqueous electrolyte secondary battery is a so-called lithium ion secondary battery, for example, for which the capacity of its negative electrode is represented by a capacity component based on intercalation and deintercalation of lithium (Li) which is an electrode reaction substance. The non-aqueous electrolyte secondary battery is of a so-called cylinder type and has, inside a battery can 11 which is hollow and substantially columnar, a wound electrode body 20 obtained by winding a pair of a belt-shaped positive electrode 21 and a belt-shaped negative electrode 22 which are layered to interpose a separator 23. The battery can 11 is configured of iron (Fe) plated with nickel (Ni), one end part thereof is closed and the other end part is opened. The electrolyte solution is injected into the battery can 11 as an electrolyte, and is impregnated into the positive electrode 21, the negative electrode 22 and the separator 23. Moreover, a pair of insulator plates 12 and 13 are disposed perpendicular to the circumferential surface of winding to interpose the wound electrode body 20.

To the opening end part of the battery can 11, a battery lid 14, a safety valve mechanism 15 provided in the battery lid 14, and a positive temperature coefficient (PTC) element 16 are attached by swaging via an opening sealing gasket 17. Thereby, the inside of the battery can 11 is sealed. The battery lid 14 is configured, for example, of a material similar to that of the battery can 11. The safety valve mechanism 15 is electrically connected to the battery lid 14 and on the occasion that the inner pressure of the battery is not less than a certain value due to internal short, heating from the outside or the like, a disc plate 15A is configured to reverse so as to cut the electric connection between the battery lid 14 and the wound electrode body 20. The opening sealing gasket 17 is configured, for example, of insulative material and its surface is applied with asphalt.

Through the center of the wound electrode body 20, for example, a center pin 24 is inserted. A positive electrode lead 25 made of aluminum (Al) or the like is connected to a positive electrode 21 of the wound electrode body 20, and a negative electrode lead 26 made of nickel or the like is connected to a negative electrode 22. The positive electrode lead 25 is welded to the safety valve mechanism 15 to be electrically connected to the battery lid 14, and the negative electrode lead 26 is welded to the battery can 11 to be electrically connected thereto.

In the non-aqueous electrolyte secondary battery according to the second embodiment, an open circuit voltage (that is, a battery voltage) in a completely charged state for each pair of the positive electrode 21 and the negative electrode 22 may be 4.2 V or less, or may be designed to be within a range that is higher than 4.2 V, preferably 4.3 V or more and 5.0 V or less, and more preferably 4.35 V or more and 4.60 V or less. When the battery voltage is set within such a range, it is possible to obtain a high energy density and an effect of improving a cycle characteristic is noticeably exhibited.

Figure 4:
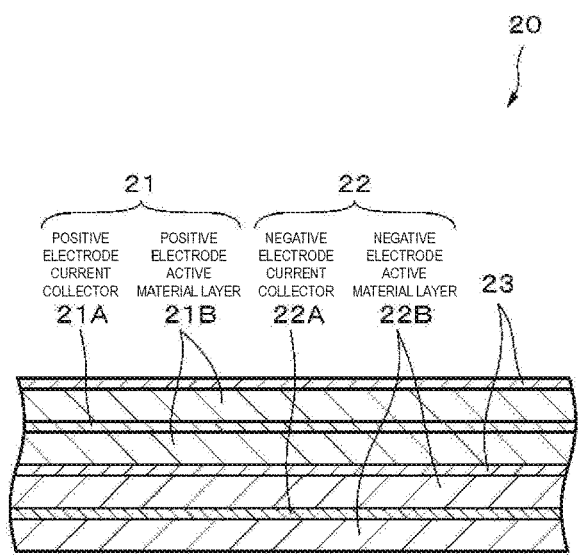
FIG. 4 is a cross-sectional view of an enlarged part of a wound electrode body shown in FIG. 3.

The positive electrode 21, the negative electrode 22, the separator 23, and the electrolyte solution of the non-aqueous electrolyte secondary battery will be sequentially described below with reference to FIG. 4.

(Positive Electrode)

The positive electrode 21 has, for example, a structure in which a positive electrode active material layer 21B is provided on both sides of a positive electrode current collector 21A. In addition, although not shown, the positive electrode active material layer 21B may be provided only on one side of the positive electrode current collector 21A. The positive electrode current collector 21A is made of metal foil, for example, aluminum foil, nickel foil, or stainless steel foil. The positive electrode active material layer 21B includes a positive electrode active material that can intercalate and deintercalate, for example, lithium (Li) serving as an electrode reactant. The positive electrode active material layer 21B may further include an additive as necessary. As the additive, for example, at least one of a conductive material and a binder can be used.

(Positive Electrode Active Material)

The positive electrode active material is the positive electrode active material according to the above-described first embodiment or the modified example thereof.

(Binder)

As a binding material, at least one selected from among, for example, resin materials such as polyvinylidene fluoride (PVdF), polytetrafluoroethylene (PTFE), polyacrylonitrile (PAN), styrene butadiene rubber (SBR), and carboxymethylcellulose (CMC), and a copolymer including such a resin material as a main component is used.

(Conductive Material)

As the conductive material, for example, a carbon material such as graphite, carbon black or Ketjen black is used, and one or two or more thereof are used in combination. In addition, any metal material or conductive polymer material that is a material having conductivity may be used in addition to the carbon material.

(Negative Electrode)

The negative electrode 22 has, for example, a structure in which negative electrode active material layers 22B are provided on the both sides of a negative electrode current collector 22A. In addition, the negative electrode active material layer 22B may be provided only on one side of the negative electrode current collector 22A, this not shown in any figure. The negative electrode current collector 22A is made of metal foil, for example, copper foil, nickel foil or stainless steel foil.

The negative electrode active material layer 22B includes one or two or more negative electrode active materials that can intercalate and deintercalate lithium as a negative electrode active material. The negative electrode active material layer 22B may further include an additive such as a binder as necessary.

In addition, in the non-aqueous electrolyte secondary battery according to the second embodiment, an electrochemical equivalent of a negative electrode material that can intercalate and deintercalate lithium is greater than an electrochemical equivalent of the positive electrode 21, and a lithium metal is not precipitated in the negative electrode 22 during charging.

As the negative electrode material that can intercalate and deintercalate lithium, a material that can intercalate and deintercalate, for example, lithium, and includes at least one of a metal element and a metalloid element as a constituent element is used. Here, the negative electrode 22 including such a negative electrode material is referred to as an alloy-based negative electrode. This is because a high energy density can be obtained with use of such a material. Such a material is preferably used together with carbon material because the high energy density and also excellent cycling characteristics can be obtained. The negative electrode material may be a simple substance, an alloy, or a compound of the metal element or the semi-metal element, or may contain, at least partly, a phase of one or more of the simple substance, alloy, or compound of the metal element or the semi-metal element. Note that in the present disclosure, the alloy includes a material formed with two or more kinds of metal elements and a material containing one or more kinds of metal elements and one or more kinds of semi-metal elements. Further, the alloy may contain a non-metal element. Examples of its texture include a solid solution, a eutectic (eutectic mixture), an intermetallic compound, and one in which two or more kinds thereof coexist.

Examples of the metal element or semi-metal element contained in this negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

It is preferable to use, as the negative electrode active material, for example, a material containing, as a constituent element, a metal element or a semi-metal element of 4B group in the short periodical table. It is more preferable to use a material containing at least one of silicon (Si) and tin (Sn) as a constituent element. This is because silicon (Si) and tin (Sn) each have a high capability of intercalating and deintercalating lithium (Li), so that a high energy density can be obtained.

Examples of the alloy of tin (Sn) include alloys containing, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of silicon (Si) include alloys containing, as a second constituent element other than silicon (Si), at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds containing oxygen (O) or carbon (C), which may contain any of the above-described second constituent elements in addition to tin (Sn) or silicon (Si). Specific examples of a compound of tin (Sn) include a silicon oxide represented by $SiO_v$ ($0.2<v<1.4$).

Examples of the negative electrode material capable of intercalating and deintercalating lithium include, for example, carbon materials such as hardly graphitizable carbon, easily graphitizable carbon, graphite, thermally degraded carbons, cokes, glassy carbons, fired bodies of organic polymers, carbon fiber and activated carbon. As the graphite, natural graphite that has undergone a spheroidizing treatment or artificial graphite having a substantially spherical shape is preferably used. As the artificial graphite, artificial graphite obtained by graphitizing mesocarbon microbeads (MCMBs) or artificial graphite obtained by graphitizing and pulverizing a coke raw material is preferable. Among these, the cokes include pitch cokes, needle cokes, petroleum cokes and the like. The fired bodies of organic polymers are carbons obtained by firing polymer materials such as phenol resin and furan resin at an appropriate temperature, and some of these are categorized as hardly graphitizable carbon or easily graphitizable carbon.

Moreover, the polymer materials include polyacetylene, polypyrrole and the like. These carbon materials are preferable for which change in crystal structure arising in charging or discharging is exceedingly small and which can attain high charge/discharge capacity and favorable cycle characteristics. Particularly, graphite is preferable which has a large electrochemical equivalent and can attain high energy density. Moreover, hardly graphitizable carbon is preferable which can attain excellent characteristics. Furthermore, one which is low in charge/discharge potential, specifically, close to lithium metal in charge/discharge potential is preferable since it can easily realize high energy density of the battery.

As the negative electrode material that can intercalate and deintercalate lithium, other metal compounds or polymer materials may be additionally exemplified. Examples of other metal compounds include an oxide such as $MnO_2$, $V_2O_5$, and $V_6O_{13}$, a sulfide such as NiS and MoS, or a lithium nitride such as $LiN_3$. Examples of the polymer materials include polyacetylene, polyaniline, and polypyrrole.

Generally, a carbon material is used as the negative electrode active material of the lithium ion secondary battery. Due to multifunctionality of recent electronic devices, power consumption is significantly increasing, and high capacity secondary batteries are being increasingly demanded. However, it will be difficult to satisfy such needs in the near future simply using carbon materials. Therefore, negative electrode active materials including Sn-based materials or Si-based materials that are materials having higher capacities than carbon materials are being actively developed. However, generally, the negative electrode active materials including Sn-based materials or Si-based materials have a high irreversible capacity during first charging. Accordingly, in order to utilize a high capacity characteristic of the negative electrode active material, the negative electrode active material is preferably used in combination with a positive electrode active material having a high capacity and a suitable irreversible capacity. As the positive electrode active material, the above-described positive electrode active material including a first positive electrode active material and a second positive electrode active material is appropriate. That is, a negative electrode active material including at least one of silicon (Si) and tin (Sn) and the above-described positive electrode active material including a first positive electrode active material and a second positive electrode active material are preferably used in combination.

(Binder)

As the binder, at least one selected from among, for example, resin materials such as polyvinylidene fluoride (PVdF), polytetrafluoroethylene (PTFE), polyacrylonitrile (PAN), styrene butadiene rubber (SBR), and carboxymethylcellulose (CMC), and a copolymer including such a resin material as a main component is used.

(Separator)

The separator 23 separates the positive electrode 21 and the negative electrode 22, prevents a current short circuit due to contact of both electrodes, and allows lithium ions to pass. The separator 23 includes, for example, a porous membrane made of a synthetic resin including polytetrafluoroethylene, polypropylene or polyethylene or a porous membrane made of a ceramic, and may have a structure in which two or more of such porous membranes are laminated. Among these, a porous membrane made of a polyolefin is preferable because it has an excellent short circuit preventing effect and can improve safety of a battery according to a shutdown effect.

In particular, the polyethylene is preferable as a material of the separator 23 because it can have a shutdown effect in a range of 100° C. or higher and 160° C. or lower and has excellent electrochemical stability. In addition, the polypropylene is preferable. Also, as long as a resin has chemical stability, it can be used in copolymerization or blending with polyethylene or polypropylene.

(Electrolyte Solution)

The separator 23 is impregnated with an electrolyte solution which is electrolyte in a liquid form. The electrolyte solution contains a solvent and an electrolyte salt dissolved in the solvent. In order to improve a battery characteristic, the electrolyte solution may include a known additive.

As the solvent, a cyclic carbonate such as ethylene carbonate and propylene carbonate can be used and it is preferable to use one of ethylene carbonate and propylene carbonate, particularly, a mixture of both. This is because cycle characteristics can be improved.

In addition to these cyclic carbonates, as the solvent, an open-chain carbonate such as diethyl carbonate, dimethyl carbonate, ethyl methyl carbonate and methyl propyl carbonate is preferable to be used as a mixture with those. This is because high ion conductivity can be attained.

Furthermore, the solvent is preferable to contain 2,4-difluoroanisole and/or vinylene carbonate. This is because 2,4-difluoroanisole can improve discharge capacity and vinylene carbonate can improve cycle characteristics. Accordingly, mixing these to be used is preferable since the discharge capacity and the cycle characteristics can be improved.

Other than these, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide, and trimethyl phosphate.

In addition, a compound obtained by substituting fluorine for at least part of hydrogen of any of these non-aqueous solvents is sometimes preferable since reversibility of the electrode reaction can be sometimes improved depending on kinds of electrodes used as a combination.

Examples of the electrolyte salt include, for example, lithium salts, one kind of them may be used solely and two or more kinds of them may be mixed to be used. Examples of the lithium salts include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiCl$, lithium difluoro[oxolato-O,O']borate, lithium bisoxalatoborate, and $LiBr$. Above all, $LiPF_6$ is preferable to be able to attain high ion conductivity and improve cycle characteristics.

In the non-aqueous electrolyte secondary battery having the above-described configuration, when charging is performed, for example, lithium ions are deintercalated from the positive electrode active material layer 21B, and intercalated into the negative electrode active material layer 22B through the electrolyte solution. In addition, when discharging is performed, for example, lithium ions are deintercalated from the negative electrode active material layer 22B and intercalated into the positive electrode active material layer 21B through the electrolyte solution.

[Manufacturing Method of Battery]

The following will show an example of a method for manufacturing the nonaqueous electrolyte secondary battery according the second embodiment of the present technology.

First, for example, a positive electrode mixture is prepared by mixing the positive electrode active material, a conductive material, and a binder, and a paste-form positive electrode mixture slurry is prepared by dispersing the positive electrode mixture into a solvent such as N-methyl-2-pyrrolidinone. Next, the positive electrode mixture slurry is applied on the positive electrode current collector 21A, the solvent is dried, and the dried mixture is compression molded with a rolling press machine or the like, so that the positive electrode active material layer 21B is formed and the positive electrode 21 is formed.

Further, for example, a negative electrode mixture is prepared by mixing a negative electrode active material and a binder, and a paste-form negative electrode mixture slurry is prepared by dispersing this negative electrode mixture in a solvent such as N-methyl-2-pyrrolidone. Next, the negative electrode mixture slurry is applied on the negative electrode current collector 22A, the solvent is dried, and the dried mixture is compression molded with a rolling press machine or the like, so that the negative electrode active material layer 22B is formed and the negative electrode 22 is produced.

Next, the positive electrode lead 25 is attached to the positive electrode current collector 21A by welding or the like, and the negative electrode lead 26 is attached to the negative electrode current collector 22A by welding or the like. Next, the positive electrode 21 and the negative electrode 22 are wound via the separator 23. Next, the tip part of the positive electrode lead 25 is welded to the safety valve mechanism 15, the tip part of the negative electrode lead 26 is welded to the battery can 11, and the wound positive electrode 21 and negative electrode 22 are interposed between the pair of insulator plates 12 and 13 and are contained inside the battery can 11. Next, after the positive electrode 21 and the negative electrode 22 are contained inside the battery can 11, the electrolyte solution is injected into the battery can 11 to impregnate the separator 23. Next, the battery lid 14, the safety valve mechanism 15 and the positive temperature coefficient element 16 are fixed to the opening end part of the battery can 11 by swaging via the opening sealing gasket 17. Thereby, the secondary battery shown in FIG. 3 is obtained.

3. Third Embodiment

[Configuration of Battery]

Figure 5:
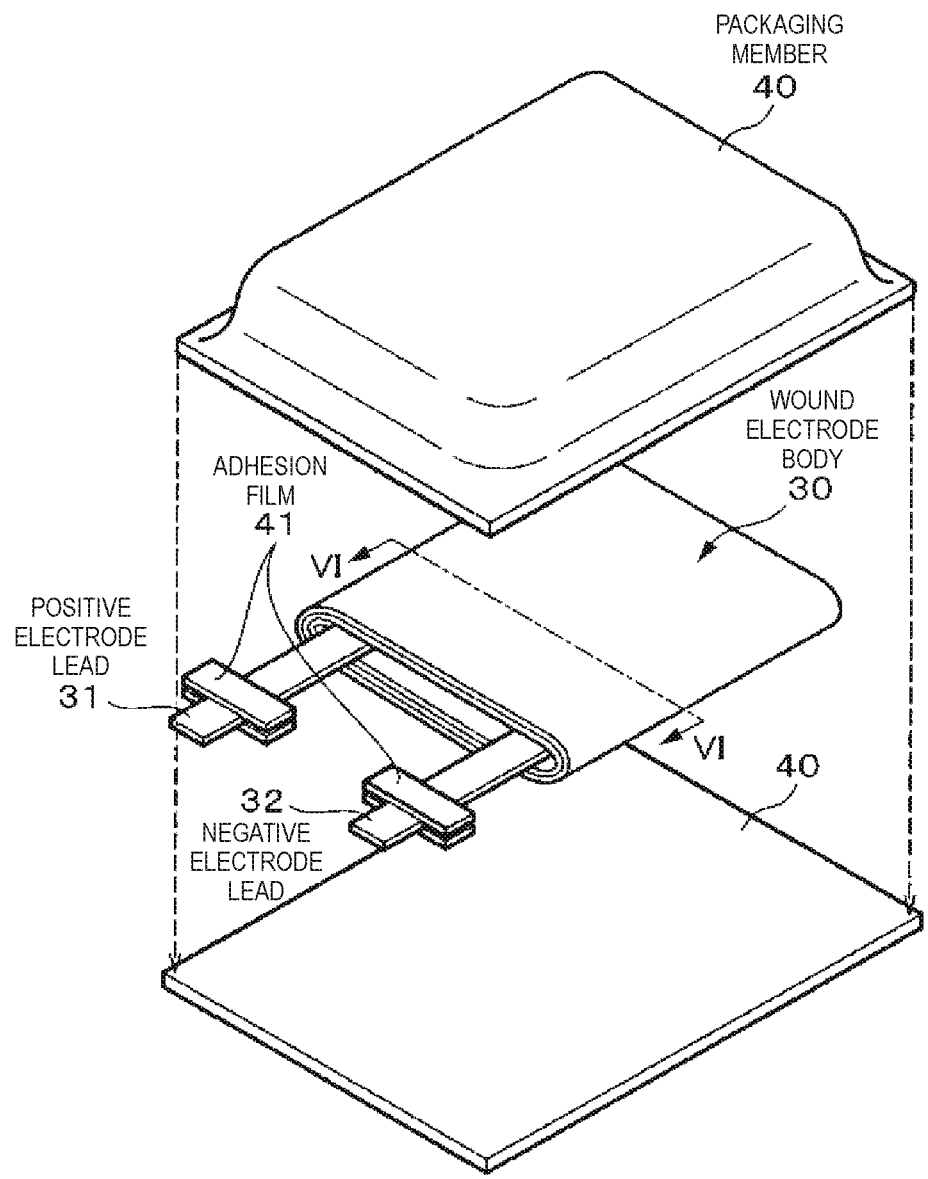
FIG. 5 is an exploded perspective view showing a configuration example of a non-aqueous electrolyte secondary battery according to a third embodiment of the present technology.

FIG. 5 is an exploded perspective view showing a configuration example of a non-aqueous electrolyte secondary battery according to a third embodiment of the present technology. The non-aqueous electrolyte secondary battery is a so-called flat battery in which a wound electrode body 30 to which a positive electrode lead 31 and a negative electrode lead 32 are attached is accommodated inside a film-like packaging member 40, and enables a small, lightweight and thin battery to be implemented.

Each of the positive electrode lead 31 and the negative electrode lead 32 is led out from the inside of the packaging member 40 toward the outside in the same direction, for example. The positive electrode lead 31 and the negative electrode lead 32 are each formed using, for example, a metal material such as aluminum, copper, nickel, or stainless steel, in a thin plate state or a network state.

Each of the packaging members 40 is configured, for example, of a rectangular aluminum laminate film obtained by pasting a nylon film, an aluminum foil and a polyethylene film in this order. Each of the packaging members 40 is disposed, for example, such that the polyethylene film side thereof faces the wound electrode body 30, and their outer edge parts adhere to each other by fusion or with an adhesive. Adhesion films 41 are inserted between the packaging members 40 and the positive electrode lead 31 and negative electrode lead 32 to prevent intrusion of the air. The adhesion film 41 is configured of a material having adherence with respect to the positive electrode lead 31 and the negative electrode lead 32, which material is, for example, polyolefin resin such as polyethylene, polypropylene, modified polyethelene and modified polypropylene.

Note that the metal layer of the packaging member 40 may also be formed using a laminated film having another lamination structure, or a polymer film such as polypropylene or a metal film, instead of the above-described aluminum laminated film.

Figure 6:
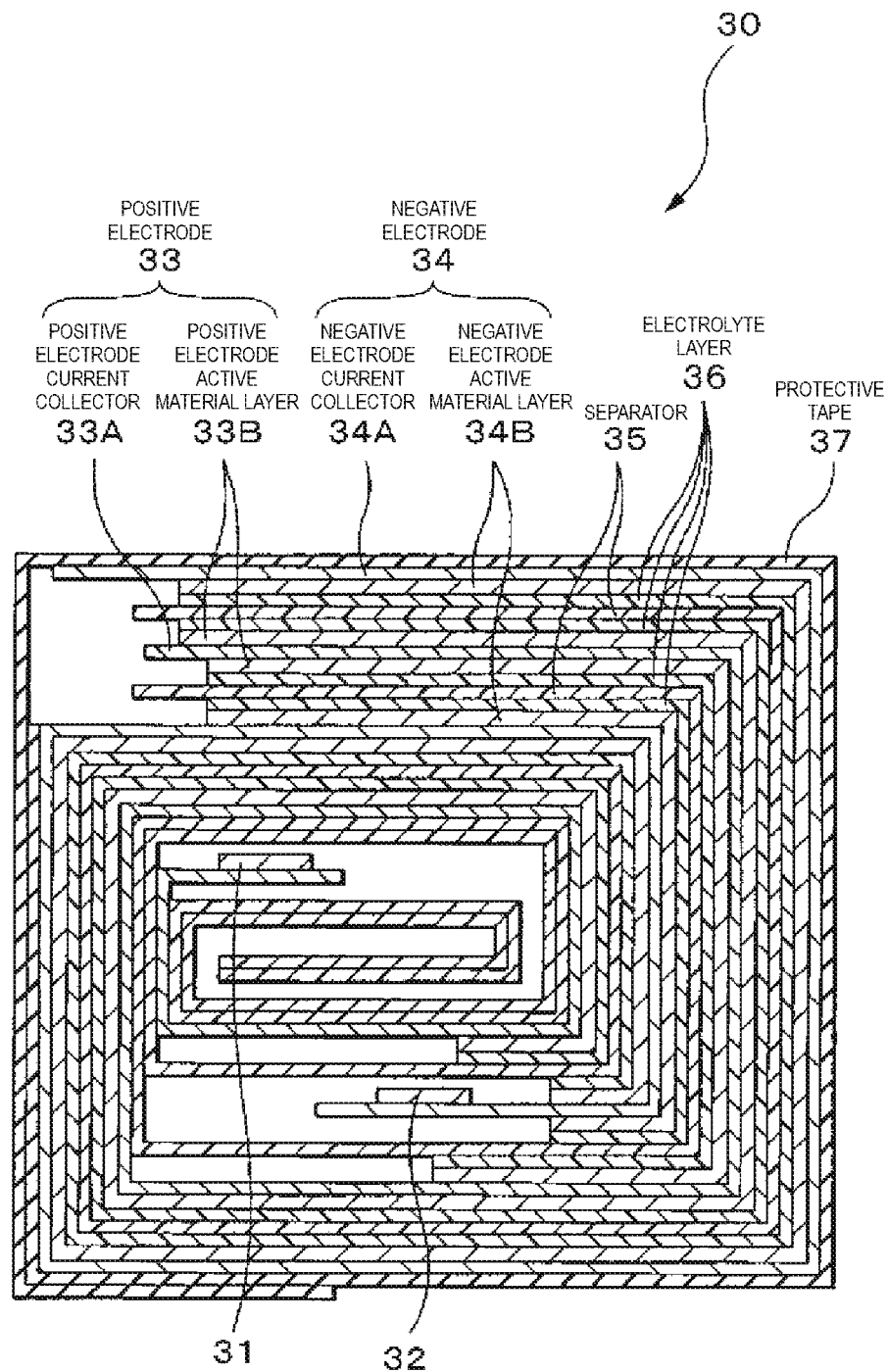
FIG. 6 is a cross-sectional view of a wound electrode body along a VI-VI line of FIG. 5.

FIG. 6 shows a cross-sectional structure along a VI-VI line of the wound electrode body 30 shown in FIG. 5. This wound electrode body 30 is prepared by laminating a positive electrode 33 and a negative electrode 34 with a separator 35 and an electrolyte layer 36 interposed therebetween and winding the laminate, and an outermost peripheral portion thereof is protected by a protective tape 37.

The positive electrode 33 has a structure in which positive electrode active material layers 33B are provided on one side or both sides of the positive electrode current collector 33A. The negative electrode 34 has a structure in which negative electrode active material layers 34B are provided on one side or both sides of the negative electrode current collector 34A, and the negative electrode active material layer 34B is disposed so as to face the positive electrode active material layer 33B. The configurations of the positive electrode current collector 33A, the positive electrode active material layer 33B, the negative electrode current collector 34A, the negative electrode active material layer 34B and the separator 35 are similar to those of the positive electrode current collector 21A, the positive electrode active material layer 21B, the negative electrode current collector 22A, the negative electrode active material layer 22B and the separator 23 in the second embodiment, respectively.

The electrolyte layer 36 contains an electrolyte solution and a polymer compound which is a retention body retaining the electrolyte solution, and is in a so-called gel form. The gel-form electrolyte layer 36 is preferable to be able to attain high ion conductivity and prevent leakage in the battery. The composition of the electrolyte solution is similar to that of the secondary battery according to the second embodiment. Examples of the polymer compound include, for example, polyacrilonitrile, polyvinylidene fluoride, copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrenebutadiene rubber, a nitrile-butadiene rubber, polystyrene and polycarbonate. Particularly, in view of electrochemical stability, polyacrilonitrile, polyvinylidene fluoride, polyhexafluoropropylene or polyethylene oxide is preferable.

[Manufacturing Method of Battery]

The following will show an example of a method for manufacturing the nonaqueous electrolyte secondary battery according the third embodiment of the present technology.

A precursor solution including a solvent, an electrolyte salt, a polymer compound, and a mixed solvent is applied on surfaces of each of the positive electrode 33 and the negative electrode 34, and the mixed solvent is then volatilized to form the electrolyte layer 36. Subsequently, the positive electrode 33 and the negative electrode 34 each having the electrolyte layer 36 formed thereon are laminated with the separator 35 interposed therebetween to form a laminate, and then the laminate is wound in a longitudinal direction thereof and the protective tape 37 is adhered to an outermost peripheral portion to form the wound electrode body 30. Finally, for example, the wound electrode body 30 is interposed between the packaging members 40, and the outer periphery portions of the packaging members 40 are adhered to each other by means of heat fusion or the like, thereby enclosing the wound electrode body 30 therein. On that occasion, the contact film 41 is inserted between each of the positive electrode lead 31 and the negative electrode lead 32 and the packaging member 40. There is thus obtained a secondary battery shown in FIGS. 5 and 6.

Alternatively, the secondary battery may be produced as follows. First of all, in the above-described manner, the positive electrode 33 and the negative electrode 34 are formed, and the positive electrode lead 31 and the negative electrode lead 32 are attached to the positive electrode 33 and the negative electrode 34, respectively. After that, the positive electrode 33 and the negative electrode 34 are laminated with the separator 35 interposed therebetween, the laminate is wound, and the protective tape 37 is adhered to an outermost peripheral portion, thereby forming a wound body which is a precursor of the wound electrode body 30. Next, the wound body is interposed between the packaging members 40, the outer peripheral portions except for one side are adhered to each other by heat fusion to make a bag form, and the wound electrode body 30 is housed in the inside of the packaging member 40. Subsequently, an electrolyte composite including, a solvent, an electrolyte salt, a monomer which is a raw material of a polymer compound, a polymerization initiator, and another material such as a polymerization inhibitor as necessary is prepared and injected into the inside of the packaging member 40.

Next, the opening part of the packaging member 40 undergoes thermal fusion under a vacuum atmosphere to be sealed after the electrolyte composite is injected into the inside of the packaging member 40. Next, it is applied with heat such that the monomer is polymerized to be a polymer compound, formed into the gel-form electrolyte layer 36. As above, the secondary battery shown in FIG. 6 is obtained.

4. Fourth Embodiment

[Configuration of Battery]

Figure 7:
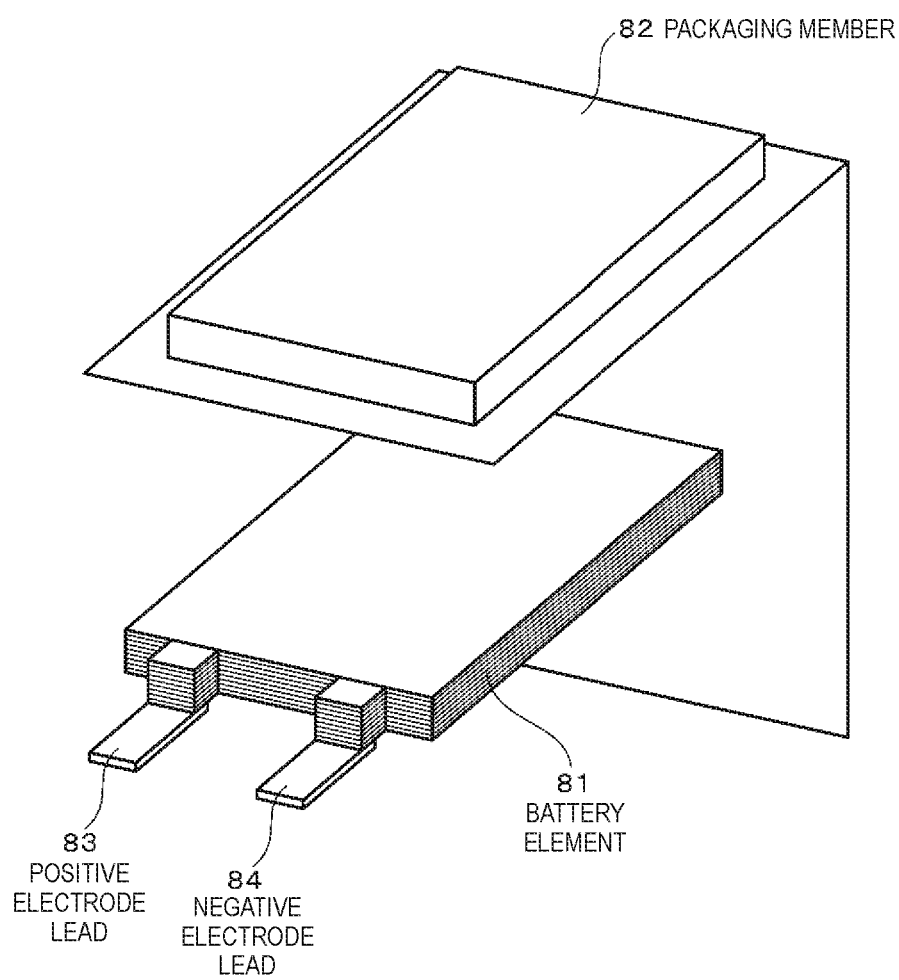
FIG. 7 is an exploded perspective view showing a configuration example of a non-aqueous electrolyte secondary battery according to a fourth embodiment of the present technology.

FIG. 7 is an exploded perspective view showing a configuration example of a non-aqueous electrolyte secondary battery according to a fourth embodiment of the present technology. As shown in FIG. 7, in the non-aqueous electrolyte secondary battery, a battery element 71 to which a positive electrode lead 73 and a negative electrode lead 74 are attached is accommodated inside a film-like packaging member 72, and enables a small, lightweight and thin battery to be implemented.

Each of the positive electrode lead 73 and the negative electrode lead 74 is led out from the inside of the packaging member 72 toward the outside in the same direction, for example.

Figure 8:
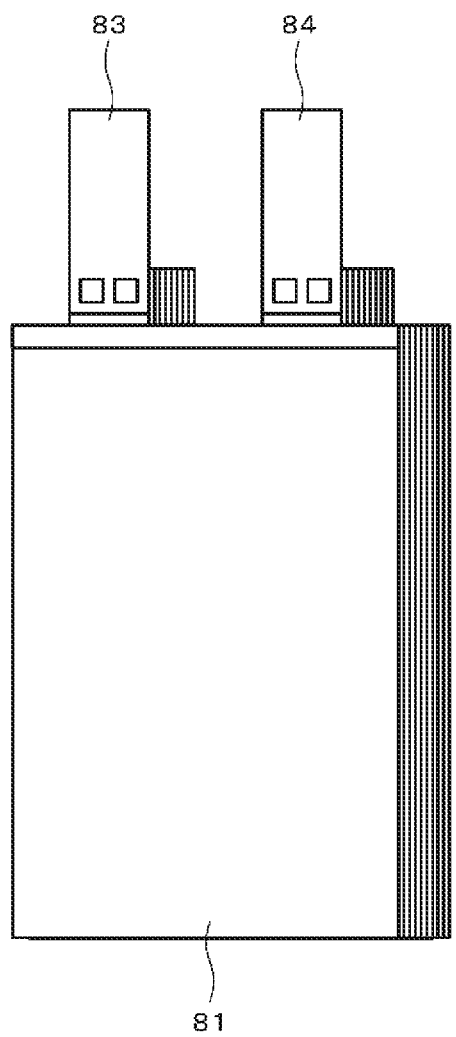
FIG. 8 is a perspective view showing an example of an exterior of a battery element shown in FIG. 7.
Figure 9:
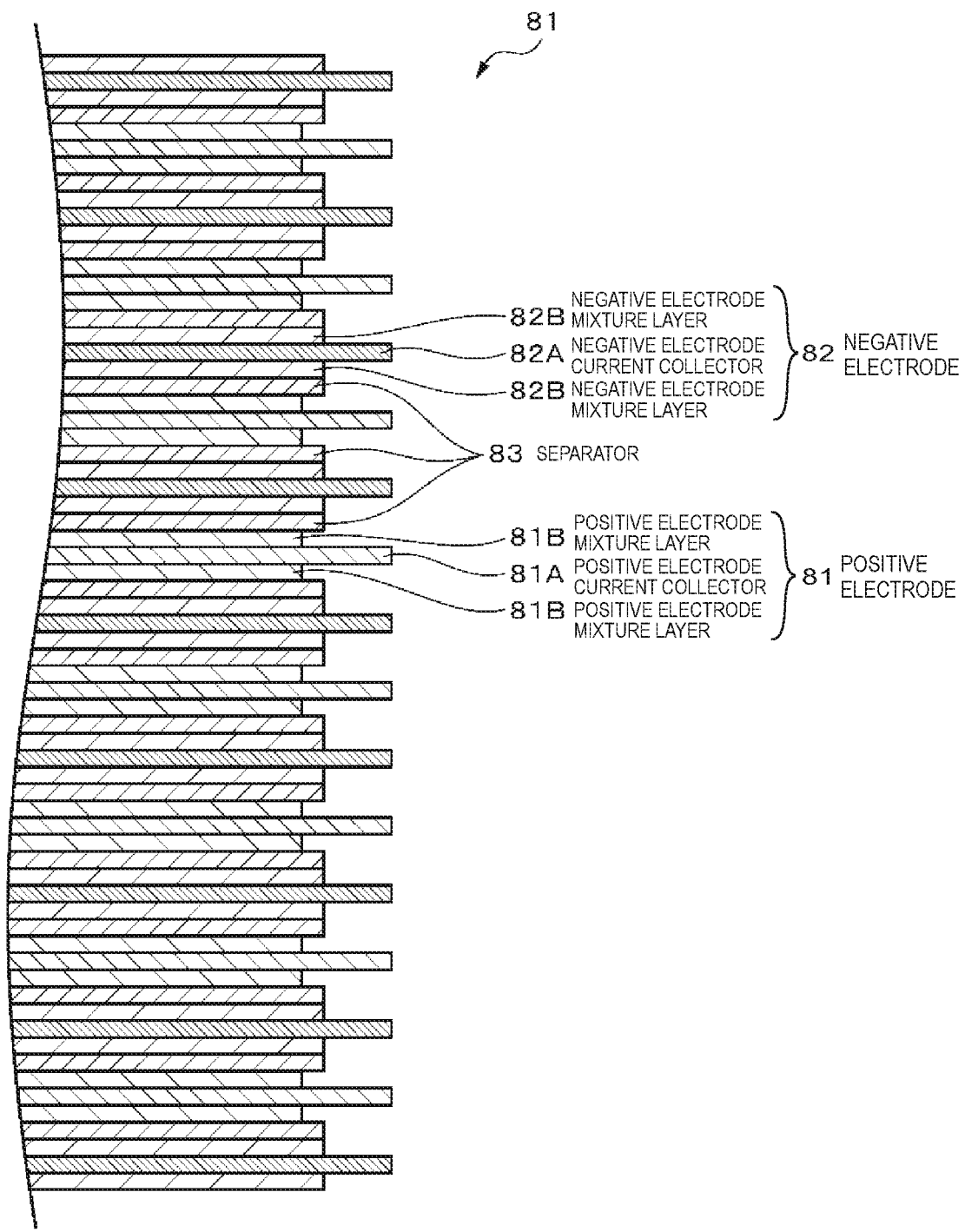
FIG. 9 is a cross-sectional view showing a configuration example of a battery element shown in FIG. 7.

FIG. 8 is a perspective view showing an example of an exterior of the battery element 71. FIG. 9 is a cross-sectional view showing a configuration example of the battery element 71. As shown in FIG. 8 and FIG. 9, the battery element 71 is a laminated electrode body in which a positive electrode 81 and a negative electrode 82 are laminated through a separator 83 and the electrolyte solution similar to that of the second embodiment is impregnated into the battery element 71.

Figure 10:
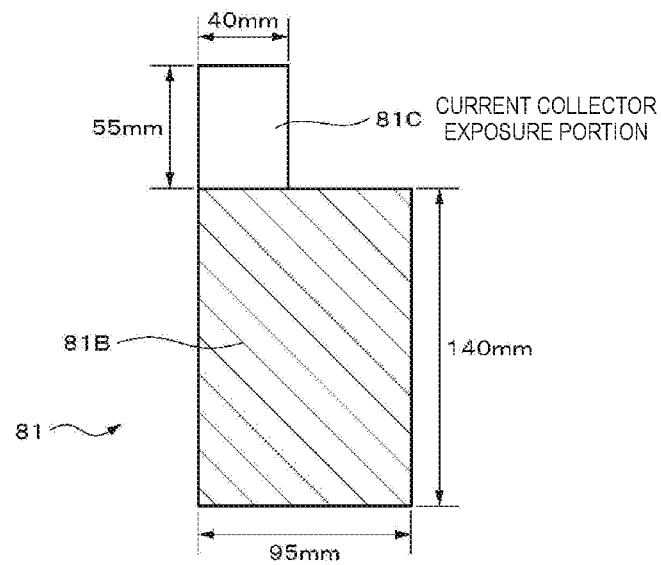
FIG. 10 is a plan view showing a configuration example of a positive electrode.

The positive electrode 81 has, for example, a structure in which a positive electrode active material layer 81B is provided on both sides of a positive electrode current collector 81A having a pair of sides. As shown in FIG. 10, the positive electrode 81 includes a rectangular electrode portion and a current collector exposure portion 81C that extends from one side of the electrode portion. In the current collector exposure portion 81C, the positive electrode active material layer 81B is not provided and the positive electrode current collector 81A is exposed. The current collector exposure portion 81C is electrically connected to the positive electrode lead 73. In addition, although not shown, a region in which the positive electrode active material layer 81B is included may be only on one side of the positive electrode current collector 81A.

Figure 11:
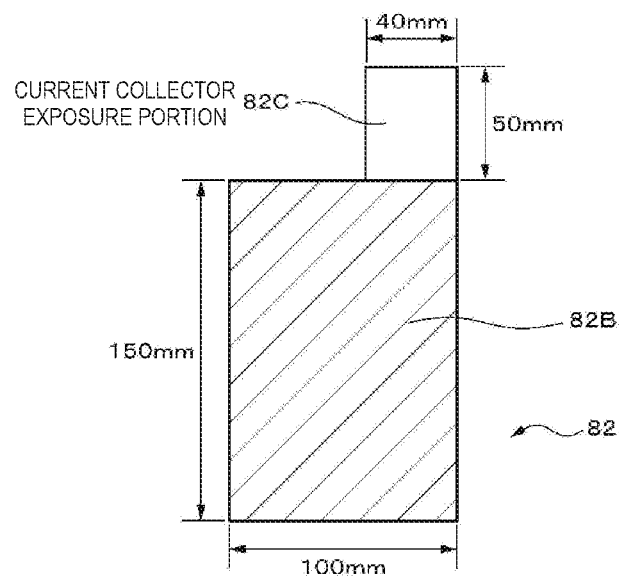
FIG. 11 is a plan view showing a configuration example of a negative electrode.

The negative electrode 82 has, for example, a structure in which a negative electrode active material layer 82B is provided on both sides of a negative electrode current collector 82A having a pair of sides. In addition, as shown in FIG. 11, the negative electrode 82 includes a rectangular electrode portion and a current collector exposure portion 82C that extends from one side of the electrode portion. In the current collector exposure portion 82C, the negative electrode active material layer 82B is not provided and the negative electrode current collector 82A is exposed. The current collector exposure portion 82C is electrically connected to the negative electrode lead 74. In addition, although not shown, a region in which the negative electrode active material layer 82B is included may be only on one side of the negative electrode current collector 82A.

Figure 12:
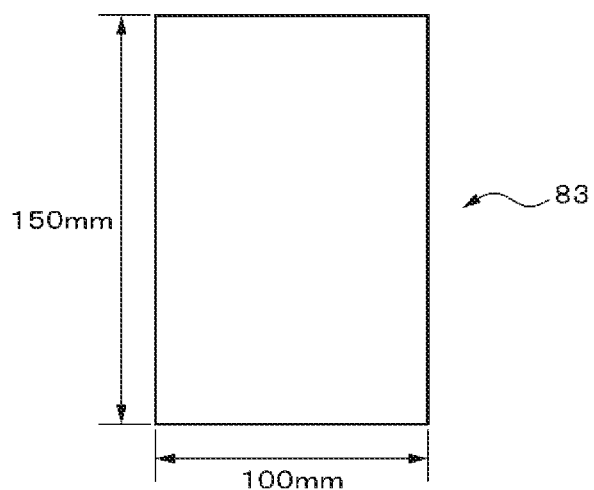
FIG. 12 is a plan view showing a configuration example of a separator.

The separator 83 has a shape such as a rectangle as shown in FIG. 12.

Materials of the positive electrode current collector 81A, the positive electrode active material layer 81B, the negative electrode current collector 82A, the negative electrode active material layer 82B, and the separator 83 are similar to those of the positive electrode current collector 21A, the positive electrode active material layer 21B, the negative electrode current collector 22A, the negative electrode active material layer 22B, and the separator 23 in the above-described second embodiment.

[Method of Manufacturing Battery]

The non-aqueous electrolyte secondary battery configured as described above can be manufactured, for example, as follows.

(Producing Positive Electrode)

The positive electrode 81 is produced as follows. First, for example, a positive electrode active material, a binder, and a conductive assistant agent are mixed to prepare a positive electrode mixture. The positive electrode mixture is dispersed in an organic solvent such as N-methylpyrrolidone to prepare a paste-form positive electrode mixture slurry. Next, the slurry is applied on both sides of the positive electrode current collector 81A, dried, and then pressed to form the positive electrode active material layer 81B. Then, the result is cut into the shape shown in FIG. 10 and the positive electrode 81 is obtained.

(Producing Negative Electrode)

The negative electrode 82 is produced as follows. First, for example, a negative electrode active material, a binder, and a conductive assistant agent are mixed to prepare a negative electrode mixture. The negative electrode mixture is dispersed in an organic solvent such as N-methylpyrrolidone to prepare a paste-form negative electrode mixture slurry. Next, the slurry is applied on both sides of the negative electrode current collector 82A, dried, and then pressed to form the negative electrode active material layer 82B. Then, the result is cut into the shape shown in FIG. 11 and the negative electrode 82 is obtained.

(Producing Battery Element)

The battery element 71 is produced as follows. First, a microporous polypropylene film is cut into the shape shown in FIG. 12 and the separator 83 is prepared. Next, the plurality of negative electrodes 82, positive electrodes 81, and separators 83 obtained as described above are laminated in an order of, for example, the negative electrode 82, the separator 83, the positive electrode 81, . . . , the positive electrode 81, the separator 83, the negative electrode 82 as shown in FIG. 9 to produce the battery element 71.

Next, the current collector exposure portion 82C of the positive electrode 81 is welded to the positive electrode lead 73. Similarly, the current collector exposure portion 82C of the negative electrode 82 is welded to the negative electrode lead 74. Next, after the electrolyte solution is impregnated into the battery element 71, the battery element 71 is interposed between the packaging members 72, and outer periphery portions of the packaging member 72 are adhered to each other by thermal welding and enclosed. In this case, the positive electrode lead 73 and the negative electrode lead 74 extend to the outside of the packaging member 72 through the thermally fused portion, and set as positive and negative electrode terminals. In this manner, a target non-aqueous electrolyte secondary battery is obtained.

Modified Example

Next, a modified example of the fourth embodiment of the present technology will be described. A non-aqueous electrolyte secondary battery according to the modified example is different from that of the fourth embodiment in that a gel-like electrolyte layer is used in place of the electrolyte solution. In addition, the same portions as in the above-described fourth embodiment are denoted with the same reference signs, and descriptions thereof will be omitted.

[Configuration of Battery]

Figure 13:
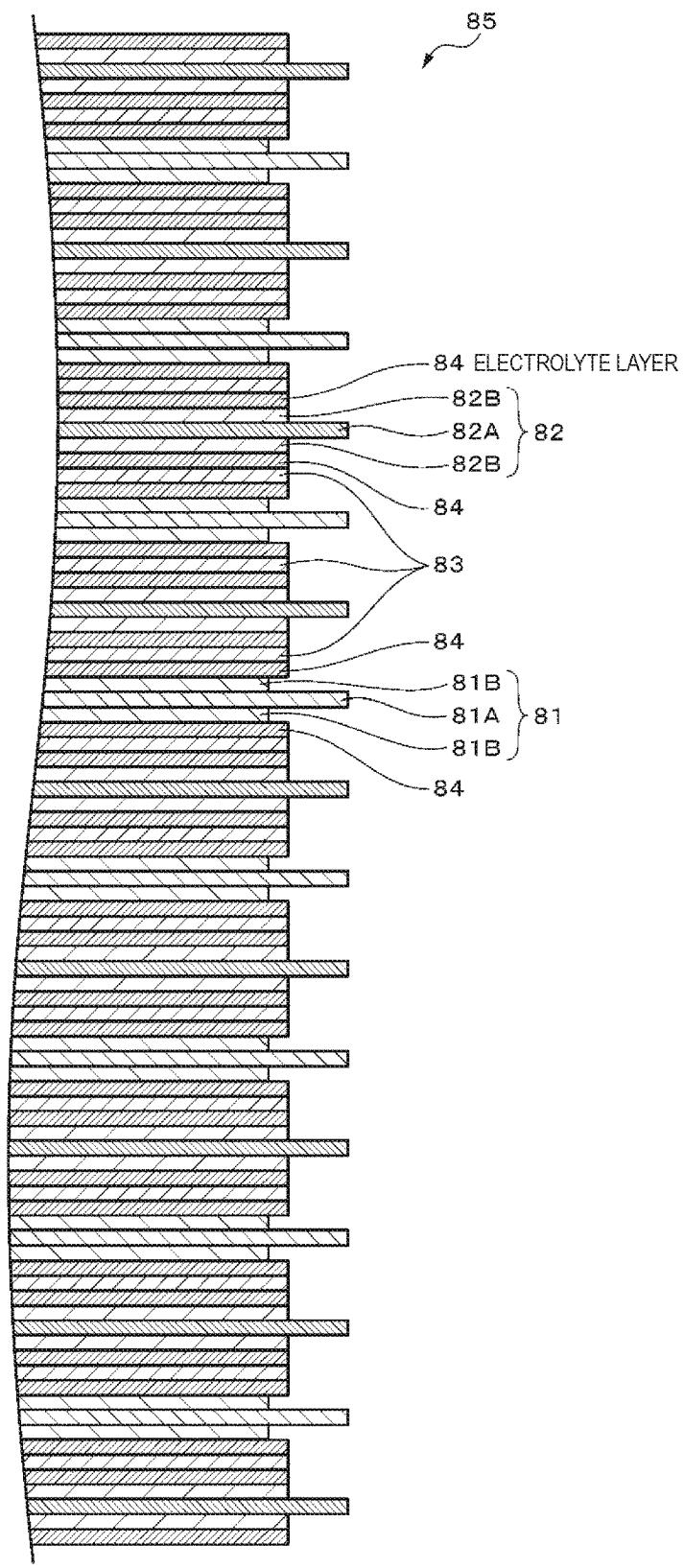
FIG. 13 is a cross-sectional view showing a configuration example of a battery element that is used in a non-aqueous electrolyte secondary battery according to a modified example of the fourth embodiment of the present technology.

FIG. 13 is a cross-sectional view showing a configuration example of a battery element that is used in a non-aqueous electrolyte secondary battery according to a modified example of the fifth embodiment of the present technology. A battery element 85 includes the positive electrode 81 and the negative electrode 82 that are laminated through the separator 83 and an electrolyte layer 84.

The electrolyte layer 84 includes the electrolyte solution according to the first embodiment and a polymer compound serving as a retention body that retains the electrolyte solution and is in a so-called gel-form. The gel-form electrolyte layer 84 is preferable because it can obtain high ionic conductivity and prevent leakage in the battery. A configuration of the polymer compound is similar to that of the non-aqueous electrolyte secondary battery according to the third embodiment.

[Method of Manufacturing Battery]

The non-aqueous electrolyte secondary battery configured as described above can be manufactured, for example, as follows.

First, a precursor solution including a solvent, an electrolyte salt, a polymer compound, and a mixed solvent is applied to each of the positive electrode 81 and the negative electrode 82, and the mixed solvent is then volatilized to form the electrolyte layer 84. Subsequent processes are similar to those of the above-described fourth embodiment except that the positive electrode 81 and the negative electrode 82 each having the electrolyte layer 84 formed thereon are used, and therefore a non-aqueous electrolyte secondary battery can be obtained.

5. Fifth Embodiment

In a fifth embodiment, a battery pack and an electronic device including the non-aqueous electrolyte secondary battery according to any of the second to fourth embodiments will be described.

Figure 14:
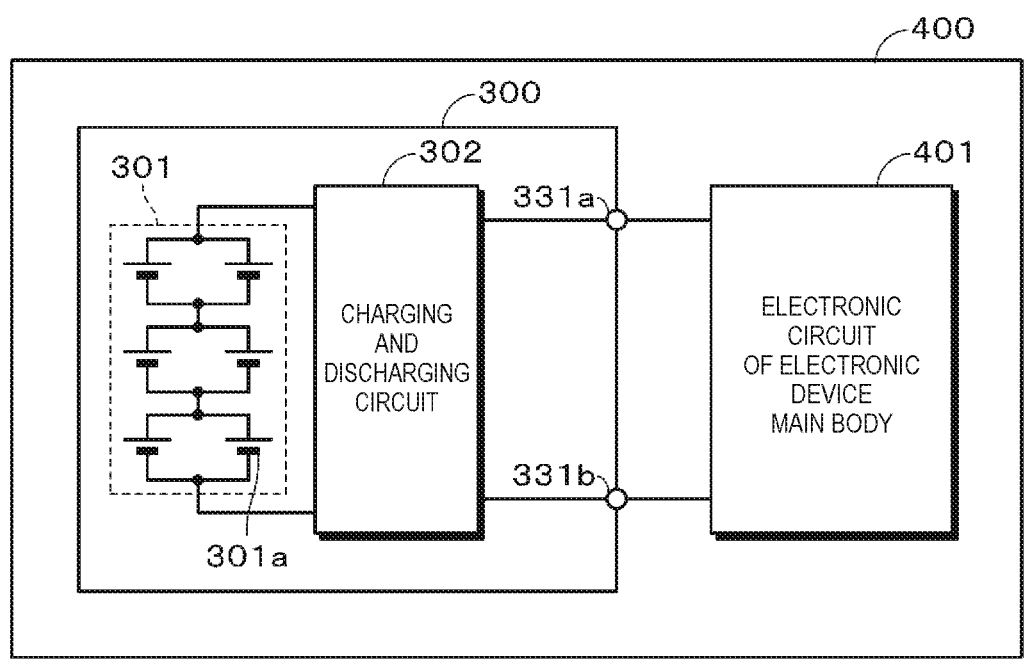
FIG. 14 is a block diagram showing a configuration example of a battery pack and an electronic device according to a fifth embodiment of the present technology.

A configuration example of a battery pack 300 and an electronic device 400 according to the fifth embodiment of the present technology will be described below with reference to FIG. 14. The electronic device 400 includes an electronic circuit 401 of an electronic device main body and the battery pack 300. The battery pack 300 is electrically connected to the electronic circuit 401 through a positive electrode terminal 331a and a negative electrode terminal 331b. The electronic device 400 has, for example, a configuration in which the battery pack 300 is detachable by a user. However, the configuration of the electronic device 400 is not limited thereto, and a configuration in which the battery pack 300 is built in the electronic device 400 so that the user is unable to remove the battery pack 300 from the electronic device 400 may be used.

When the battery pack 300 is charged, the positive electrode terminal 331a and the negative electrode terminal 331b of the battery pack 300 are connected to a positive electrode terminal and a negative electrode terminal of a charger (not shown), respectively. On the other hand, when the battery pack 300 is discharged (when the electronic device 400 is used), the positive electrode terminal 331a and the negative electrode terminal 331b of the battery pack 300 are connected to a positive electrode terminal and a negative electrode terminal of the electronic circuit 401, respectively.

Examples of the electronic device 400 include a notebook personal computer, a tablet computer, a mobile phone (for example, a smartphone), a personal digital assistant (PDA), an imaging device (for example, a digital still camera and a digital video camera), an audio device (for example, a portable audio player), a game device, a cordless phone extension unit, an E-book, an electronic dictionary, a radio, a headphone, a navigation system, a memory card, a pacemaker, a hearing aid, an electric tool, an electric shaver, a refrigerator, an air conditioner, a TV, a stereo, a water heater, a microwave, a dishwasher, a washing machine, a dryer, a lighting device, a toy, a medical device, a robot, a load conditioner, and a traffic light, and the present technology is not limited thereto.

(Electronic Circuit)

The electronic circuit 401 includes, for example, a CPU, a peripheral logic unit, an interface unit, and a storage unit, and controls the entire electronic device 400.

(Battery Pack)

The battery pack 300 includes an assembled battery 301 and a charging and discharging circuit 302. The assembled battery 301 includes a plurality of secondary batteries 301a that are connected in series and/or parallel. The plurality of secondary batteries 301a are connected, for example, in n parallel m series (n and m are positive integers). In addition, FIG. 14 shows an example in which six secondary batteries 301a are connected in 2 parallel 3 series (2P3S). As the secondary battery 301a, the non-aqueous electrolyte secondary battery according to any of the second to fourth embodiments is used.

When charging is performed, the charging and discharging circuit 302 controls charging of the assembled battery 301. On the other hand, when discharging is performed (that is, when the electronic device 400 is used), the charging and discharging circuit 302 controls discharging of the electronic device 400.

6. Sixth Embodiment

In a sixth embodiment, a power storage system in which the non-aqueous electrolyte secondary battery according to any of the second to fourth embodiments is included in a power storage device will be described. The power storage system may be any system that uses power and also includes a simple power device. The power system includes, for example, a smart grid, a home energy management system (HEMS), and a vehicle, and can store power.

[Configuration of Power Storage System]

Figure 15:
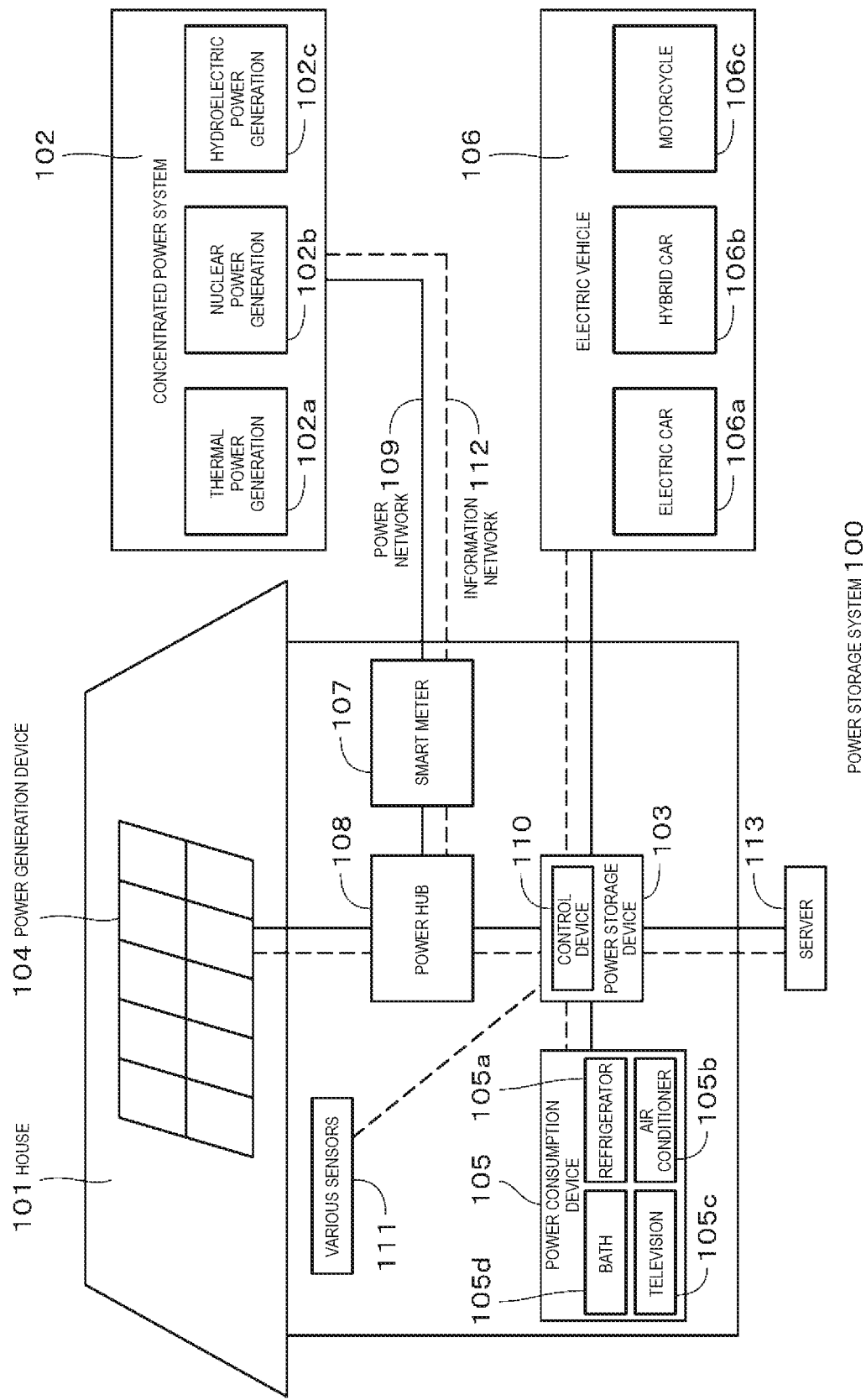
FIG. 15 is a schematic diagram showing a configuration example of a power storage system according to a sixth embodiment of the present technology.

A configuration example of a power storage system (power system) 100 according to the sixth embodiment will be described below with reference to FIG. 15. The power storage system 100 is for a house, and power is supplied to the power storage device 103 from a concentrated power system 102 including thermal power generation 102a, nuclear power generation 102b, hydroelectric power generation 102c, and the like, via a power network 109, an information network 112, a smart meter 107, a power hub 108, and the like. Further, power is supplied to the power storage device 103 from an independent power source such as a home power generation device 104. Power supplied to the power storage device 103 is stored, and power to be used in the house 101 is fed with use of the power storage device 103. The same power storage system can be used not only in the house 101 but also in a building.

The house 101 is provided with the home power generation device 104, a power consumption device 105, the power storage device 103, a control device 110 which controls each device, the smart meter 107, the power hub 108, and sensors 111 which acquires various pieces of information. The devices are connected to each other by the power network 109 and the information network 112. As the home power generation device 104, a solar cell, a fuel cell, or the like is used, and generated power is supplied to the power consumption device 105 and/or the power storage device 103. Examples of the power consumption device 105 include a refrigerator 105a, an air conditioner 105b, a television receiver 105c, a bath 105d, and the like. Examples of the power consumption device 105 further include an electric vehicle 106 such as an electric car 106a, a hybrid car 106b, or a motorcycle 106c.

The power storage device 103 includes the nonaqueous electrolyte secondary battery according any of the second embodiment to the fourth embodiment of the present technology. Functions of the smart meter 107 include measuring the used amount of commercial power and transmitting the measured used amount to a power company. The power network 109 may be any one or more of DC power supply, AC power supply, and contactless power supply.

Examples of the various sensors 111 include a motion sensor, an illumination sensor, an object detecting sensor, a power consumption sensor, a vibration sensor, a touch sensor, a temperature sensor, an infrared sensor, and the like. Information acquired by the various sensors 111 is transmitted to the control device 110. With the information from the sensors 111, weather conditions, people conditions, and the like are caught, and the power consumption device 105 is automatically controlled so as to make the energy consumption minimum. Further, the control device 110 can transmit information about the house 101 to an external power company via the Internet, for example.

The power hub 108 performs processes such as branching off power lines and DC/AC conversion. Examples of communication schemes of the information network 112 connected to the control device 110 include a method using a communication interface such as UART (Universal Asynchronous Receiver/Transceiver), and a method using a sensor network according to a wireless communication standard such as Bluetooth (registered trademark), ZigBee, or Wi-Fi. A Bluetooth (registered trademark) scheme can be used for multimedia communication, and one-to-many connection communication can be performed. ZigBee uses a physical layer of IEEE (Institute of Electrical and Electronics Engineers) 802.15.4. IEEE802.15.4 is the name of a near-field wireless network standard called PAN (Personal Area Network) or W (Wireless) PAN.

The control device 110 is connected to an external server 113. The server 113 may be managed by any of the house 101, an electric company, and a service provider. Examples of information transmitted and received by the server 113 include power consumption information, life pattern information, electric fee, weather information, natural disaster information, and information about power trade. Such information may be transmitted and received by the power consumption device (e.g., the television receiver) in the house, or may be transmitted and received by a device (e.g., a mobile phone) outside the house. Further, such information may be displayed on a device having a display function, such as the television receiver, the mobile phone, or the PDA (Personal Digital Assistant).

The control device 110 controlling each part is configured with a CPU (Central Processing Unit), a RAM (Random Access Memory), a ROM (Read Only Memory), and the like, and is stored in the power storage device 103 in this example. The control device 110 is connected to the power storage device 103, the home power generation device 104, the power consumption device 105, the various sensors 111, and the server 113 via the information network 112, and has a function of adjusting the used amount of commercial power and the power generation amount, for example. Note that the control device 110 may further have a function of performing power trade in the power market.

As described above, power generated by not only the concentrated power system 102 such as the thermal power generation 102a, the nuclear power generation 102b, and the hydroelectric power generation 102c, but also the home power generation device 104 (solar power generation or wind power generation) can be stored in the power storage device 103. Therefore, even when the power generated by the home power generation device 104 varies, the amount of power supplied to the outside can be constant, or only necessary discharge can be controlled. For example, power generated by the solar power generation can be stored in the power storage device 103 and also inexpensive power at midnight can be stored in the power storage device 103 during nighttime, so that power stored in the power storage device 103 can be discharged and used when the power fee is expensive during daytime.

Note that although this example shows the control device 110 housed in the inside of the power storage device 103, the control device 110 may be housed in the inside of the smart meter 107 or configured independently. Further, the power storage system 100 may be used for a plurality of houses in a multiple dwelling house or a plurality of separate houses.

7. Seventh Embodiment

In a seventh embodiment, an electric vehicle including the non-aqueous electrolyte secondary battery according to any of the second to fourth embodiments will be described.

Figure 16:
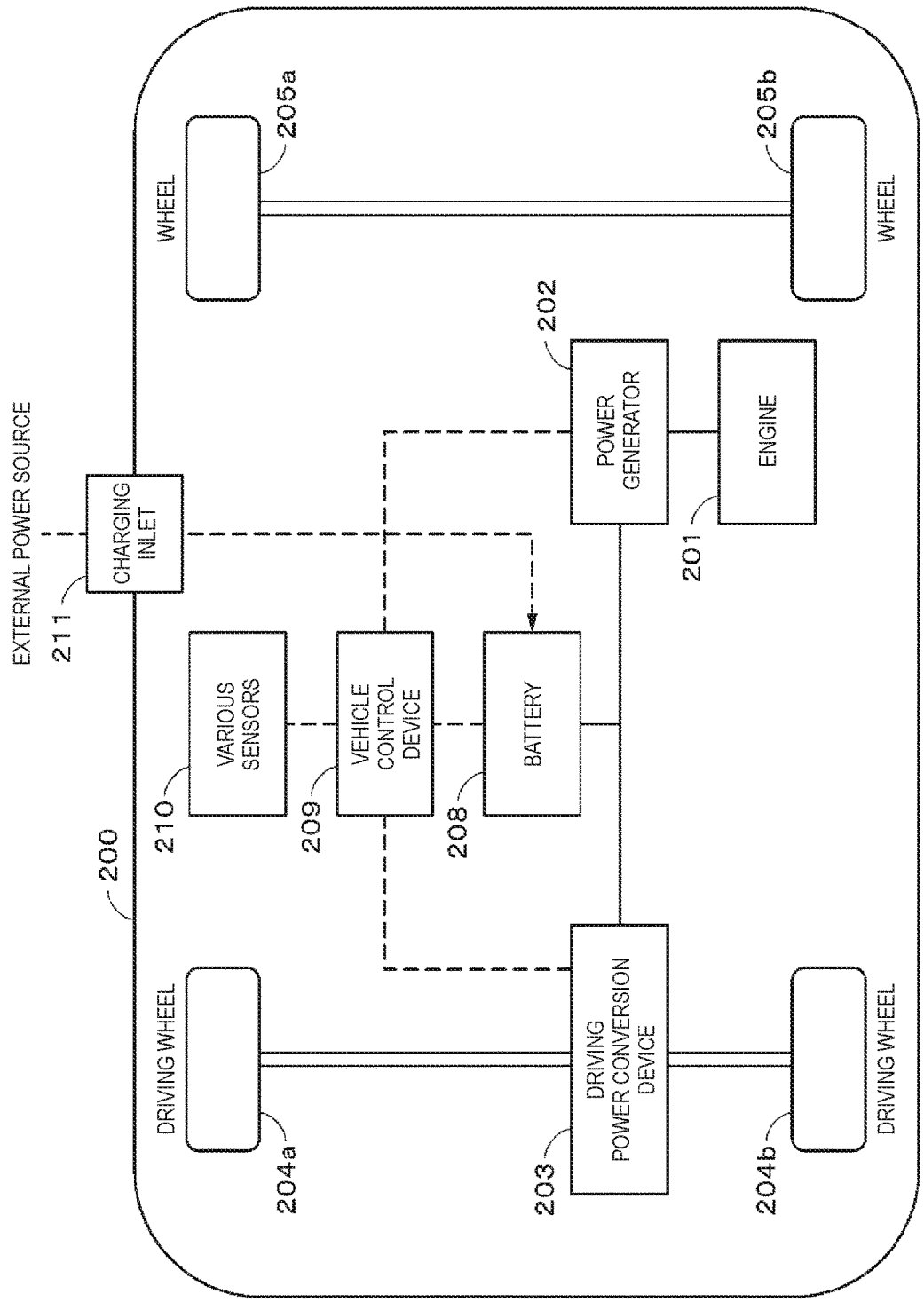
FIG. 16 is a schematic diagram showing a configuration of an electric vehicle according to a seventh embodiment of the present technology.

A configuration of an electric vehicle according to the sixth embodiment of the present technology will be described with reference to FIG. 16. The hybrid vehicle 200 is a hybrid vehicle that uses a series hybrid system. The series hybrid system is a vehicle that uses power generated by a power generator that is moved by an engine or power that is generated by a power generator and stored temporarily in a battery and is operated by a driving power conversion device 203.

A hybrid vehicle 200 incorporates an engine 201, a power generator 202, the driving power conversion device 203, driving wheels 204a and 204b, wheels 205a and 205b, a battery 208, a vehicle control device 209, various sensors 210, and a charging inlet 211. For the battery 208, the nonaqueous electrolyte secondary battery according any of the second embodiment to the fourth embodiment of the above-described present technology is used.

The hybrid vehicle 200 runs by using the driving power conversion device 203 as a power source. One of examples of the driving power conversion device 203 is a motor. Power in the battery 208 drives the driving power conversion device 203, and the rotating power of the driving power conversion device 203 is transmitted to the driving wheels 204a and 204b. Note that by using DC/AC conversion or AC/DC conversion in a necessary portion, an alternate current motor or a direct current motor can be used for the driving power conversion device 203. The various sensors 210 control the number of engine rotation via the vehicle control device 209 and controls the aperture of an unshown throttle valve (throttle aperture). The various sensors 210 include a speed sensor, an acceleration sensor, a sensor of the number of engine rotation, and the like.

The rotating power of the engine 201 is transmitted to the power generator 202, and power generated by the power generator 202 with the rotating power can be stored in the battery 208.

When the hybrid vehicle 200 reduces the speed with an unshown brake mechanism, the resisting power at the time of the speed reduction is added to the driving power conversion device 203 as the rotating power, and regenerative power generated by the driving power conversion device 203 with this rotating power is stored in the battery 208.

The battery 208 is connected to a power source outside the hybrid vehicle 200 through the charging inlet 211, receives power supply from the external power source using the charging inlet 211 as an input port, and can accumulate the received power.

Although not shown, an information processing device which performs information processing about vehicle control based on information about the non-aqueous electrolyte secondary battery may be provided. Examples of such an information processing device include an information processing device which displays the remaining battery based on information about the remaining non-aqueous electrolyte secondary battery.

Note that the above description is made by taking an example of the series hybrid car which runs with a motor using power generated by a power generator driven by an engine or power obtained by storing the power in a battery.

However, an embodiment of the present disclosure can also be applied effectively to a parallel hybrid car which uses the output of an engine and a motor as the driving power source and switches three modes as appropriate: driving with the engine only; driving with the motor only; and driving with the engine and the motor. Further, an embodiment of the present disclosure can also be applied effectively to a so-called electric vehicle which runs by being driven with a driving motor only, without an engine.

EXAMPLES

The present technology will be described below in detail with reference to examples and the present technology is not limited to the following examples.

Examples of the present technology will be described in the following order.
i. Configuration of composite particle
ii. Second covering material
iii. Covering amount of second covering material
iv. Core particle and first covering material
v. Formation into secondary particle Example 1 i. Configuration of Composite Particle

[Process of Preparing Core Particle Powder]

A cobalt oxide and lithium carbonate were mixed at a molar ratio (Li:Co) of 1:1 (an amount of Li:an amount of Co), calcined at 1000° C. for 6 hours in air, and gradually cooled, and thus high crystalline $LiCoO_2$ particle powder was obtained.

[Process of Preparing First Covering Material]

A cobalt oxide and lithium carbonate were mixed at a molar ratio (Li:Co) of 1:1 (an amount of Li:an amount of Co), calcined at 1000° C. for 6 hours in air, and quenched at room temperature, and thus low crystalline $LiCoO_2$ particle powder was obtained.

[Process of Preparing Second Covering Material]

A composite hydroxide of Ni, Mn, and Co and lithium carbonate were mixed at a molar ratio (Li:Ni:Co:Mn) of 10:5:2:3 (an amount of Li:an amount of Ni:an amount of Co:an amount of Mn), and calcined at 900° C. for 6 hours in air, and thus $LiNi_{0.5}Co_{0.2}Mn_{0.3}O_2$ particle powder was obtained.

[Process of Preparing Single-Layer-Covered Composite Particle Powder]

The obtained high crystalline $LiCoO_2$ particle powder of 97 weight % and the obtained low crystalline $LiCoO_2$ particle powder of 3 weight % were formulated, and input into a high speed stirring and mixing device (Nobilta commercially available from Hosokawa Micron Group) that was one of high-speed rotary impact pulverizers. A treatment was performed for 10 minutes by rotating a rotor blade at 1000 rpm, the low crystalline $LiCoO_2$ particle was deposited on a surface of the high crystalline $LiCoO_2$ particle, and thus single-layer-covered composite particle powder was obtained.

[Process of Preparing 2-Layer-Covered Composite Particle Powder]

The obtained single-layer-covered composite particle powder of 97 weight % and the obtained $LiNi_{0.5}Co_{0.2}Mn_{0.3}O_2$ particle powder of 3 weight % were formulated, and input into the high speed stirring and mixing device (Nobilta commercially available from Hosokawa Micron Group) that was one of high-speed rotary impact pulverizers. A treatment was performed for 10 minutes by rotating a rotor blade at 1000 rpm, the high crystalline $LiNi_{0.5}Co_{0.2}Mn_{0.3}O_2$ particle was deposited on a surface of the single-layer-covered composite particle, and thus 2-layer-covered composite particle powder was prepared. In this manner, a target positive electrode active material was obtained.

Example 2

A positive electrode active material was obtained in the same manner as in Example 1 except that high crystalline $LiCoO_2$ particle powder of 99 weight % and low crystalline $LiCoO_2$ particle powder of 1 weight % were formulated.

Example 3

A positive electrode active material was obtained in the same manner as in Example 1 except that high crystalline $LiCoO_2$ particle powder of 99.5 weight % and low crystalline $LiCoO_2$ particle powder of 0.5 weight % were formulated.

Comparative Example 1

A process of preparing core particle powder, a process of preparing a first covering material, and a process of preparing a single-layer-covered composite particle were performed in the same manner as in Example 2, and thus single-layer-covered composite particle powder was obtained as a positive electrode active material.

Comparative Example 2

A positive electrode active material was obtained in the same manner as in Example 2 except that low crystalline $LiCoO_2$ particle powder was used as core particle powder. In addition, the core particle powder was prepared as follows.
[Process of Preparing Core Particle Powder]

First, a cobalt oxide and lithium carbonate were mixed at a molar ratio (Li:Co) of 1:1 (an amount of Li:an amount of Co), calcined at 1000° C. for 6 hours in air, and quenched at room temperature, and thus low crystalline $LiCoO_2$ particle powder was obtained.

Comparative Example 3

A positive electrode active material was obtained in the same manner as in Example 2 except that high crystalline $LiCoO_2$ particle powder was used as a first covering material. In addition, the first covering material was prepared as follows.
[Process of Preparing First Covering Material]

A cobalt oxide and lithium carbonate were mixed at a molar ratio (Li:Co) of 1:1 (an amount of Li:an amount of Co), calcined at 1000° C. for 6 hours in air, and gradually cooled, and thus high crystalline $LiCoO_2$ particle powder was obtained.

Comparative Example 4

A positive electrode active material was obtained in the same manner as in Example 2 except that low crystalline $LiNi_{0.5}Co_{0.2}Mn_{0.3}O_2$ particle powder was used as a first covering material. In addition, the first covering material was prepared as follows.

[Process of Preparing First Covering Material]

A composite hydroxide of Ni, Mn, and Co and lithium carbonate were mixed at a molar ratio (Li:Ni:Co:Mn) of 10:5:2:3 (an amount of Li:an amount of Ni:an amount of Co:an amount of Mn), calcined at 900° C. for 6 hours in air, and quenched at room temperature, and thus low crystalline $LiNi_{0.5}Co_{0.2}Mn_{0.3}O_2$ particle powder was obtained.

(Evaluation of Positive Electrode Active Materials)

The following evaluations were performed on the positive electrode active materials of Examples 1 to 3, and Comparative Examples 1 to 4 obtained as described above.

(Peak Intensity Ratio in Raman Spectra)

First, Raman spectra of the positive electrode active materials obtained as described above were obtained. RAMAN-11 commercially available from Nanophoton was used as a Raman spectrometer device. Analysis conditions include conditions that a spectrometer of 1200 gr/mm was used at a laser wavelength of 532 nm and a resolution of 2.0 $cm^{-1}$. Next, baseline correction was performed on the obtained Raman spectra, fitting was performed using a Gauss function, and an intensity A of a peak in a range of 550 $cm^{-1}$ or more and 650 $cm^{-1}$ or less, and an intensity E of a peak in a range of 450 $cm^{-1}$ or more and 500 $cm^{-1}$ or less were determined. Next, a peak intensity ratio E/A was determined using the determined peaks intensities A and E.

In addition, a peak intensity ratio E/A of core particles alone used to prepare the positive electrode active materials of Examples 1 to 3 was determined similarly to that of the positive electrode active material.

(Cycle Characteristic)

The positive electrode active materials obtained as described above were used to produce a laminated lithium ion secondary battery having a capacity of 500 mAh as follows.

(Producing Positive Electrode)

A positive electrode was produced as follows. First, positive electrode active material powder of 90 parts by weight, polyvinylidene fluoride (PVdF) of 5 parts by weight, carbon black of 5 parts by weight, and N-methylpyrrolidone (NMP) (quantity outside) were mixed in a mixer. N-methylpyrrolidone (NMP) was additionally added and dispersed to obtain a desired viscosity and a positive electrode mixture slurry was obtained. The slurry was applied to both sides of aluminum foil having a thickness of 15 μm, dried, and then pressed. Thus, a positive electrode mixture layer was formed. In this case, exposure portions of about 30 mm remained on both sides of the aluminum foil. In this case, application ends of both sides were set to be substantially collinear. Then, the result was cut into the shape shown in FIG. 10 and the positive electrode was obtained.

(Producing Negative Electrode)

A negative electrode was produced as follows. First, artificial graphite of 90 parts by weight, polyvinylidene fluoride (PVdF) of 5 parts by weight, carbon black of 5 parts by weight, and N-methylpyrrolidone (NMP) (quantity outside) were mixed, and a negative electrode mixture slurry was obtained. Next, the slurry was applied to both sides of copper foil having a thickness of 15 μm, dried, and then pressed. Thus, a negative electrode mixture layer was formed. In this case, a copper foil exposure portion of about 30 mm remained. In this case, application ends of both sides were set to be substantially collinear. Then, the result was cut into the shape shown in FIG. 11 and the negative electrode was obtained.

In addition, before the negative electrode mixture layer and the positive electrode mixture layer were applied to and formed on the current collector, a lithium intercalating capability for each weight of a negative electrode mixture and a lithium deintercalating capability for each weight of a positive electrode mixture were measured in advance. A lithium intercalating capability for each unit area of the negative electrode mixture layer was set to not exceed a lithium deintercalating capability for each unit area of the positive electrode mixture layer.

(Producing Battery Element)

A battery element was produced as follows. First, a microporous polypropylene film having a thickness of 25 μm was cut into the shape shown in FIG. 12, and used as a separator. Next, 9 negative electrodes, 8 positive electrodes, and 16 separators obtained as described above were laminated in the order of a negative electrode, a separator, a positive electrode, . . . , a positive electrode, a separator, a negative electrode as shown in FIG. 9. Accordingly, a battery element including 16 layers of a basic laminate unit that includes a positive electrode mixture layer, a separator, and a negative electrode mixture layer was obtained. In addition, upper and lower outmost layers of the battery element serve as the negative electrode mixture layers. However, since such portions do not face a positive electrode, they do not contribute to a battery reaction. In addition, during lamination, a relative position of the negative electrode and the positive electrode was adjusted so that a projection surface of the positive electrode mixture layer was fitted into a projection surface of the negative electrode mixture layer in a lamination direction.

Next, as shown in FIG. 8, 8 current collector exposure portions of the positive electrode were ultrasonically welded to a positive electrode lead made of aluminum at the same time. Similarly, 9 current collector exposure portions of the negative electrode were ultrasonically welded to a negative electrode lead made of nickel at the same time. Next, a solution in which $LiPF_6$ of 1 mol/l was dissolved in a solvent in which equal volumes of ethylene carbonate (EC) and dimethyl carbonate (DMC) were mixed was prepared as a non-aqueous electrolyte solution. The non-aqueous electrolyte solution was impregnated into the battery element, a packaging material including an aluminum laminate film including a resin layer, an aluminum layer, and a resin layer was then used, and an opening portion was then thermally fused under reduced pressure to seal the battery element. In this case, positive and negative electrode leads extended to the outside of the packaging member through the thermally fused portion and were set as positive and negative electrode terminals. In this manner, a target lithium ion secondary battery was obtained.

A cycle characteristic of the produced secondary battery was evaluated as follows. First, in a high temperature environment (45° C.), the secondary battery was charged and discharged for 1 cycle. In the same environment, the secondary battery was additionally charged and discharged for 1 cycle and a discharge capacity was measured. Subsequently, in the same environment, charging and discharging were repeated until a total number of cycles was 100, and a discharge capacity was measured. Based on the result, a cycle retention rate (%)=(discharge capacity of the 100th cycle/discharge capacity of the 2nd cycle)×100 was calculated.

When charging was performed, constant current charging was performed until an upper limit voltage at a current of 1 C reached 4.45 V, and then constant voltage charging was performed until a current at a voltage of 4.45 V reached 0.05 C. When discharging was performed, constant current discharging was performed until a termination voltage at a current of 1 C reached 3.0 V. Here, "1 C" is a current value necessary for a battery capacity (a theoretical capacity) to be discharged in 1 hour and "0.05 C" is a current value necessary for a battery capacity to be discharged in 20 hours. (Initial Capacity, 4.55 V Charge and Discharge Efficiency)

For the positive electrode used in the above-described "cycle characteristic" evaluation, a coin cell of a counter electrode Li was produced. 4.55 V charge and discharge efficiency of a single electrode was evaluated as follows. In a room temperature environment (23° C.), a secondary battery was charged and discharged for 1 cycle and a charge and discharge capacity was measured. Based on the result, a 4.55 V charge and discharge efficiency (%)=(discharge capacity of the 1st cycle/charge capacity of the 1st cycle)× 100 was calculated.

When charging was performed, constant current charging was performed until an upper limit voltage at a current of 0.1 C reached 4.55 V, and then constant voltage charging was performed until a current at a voltage of 4.55 V reached 0.01 C. When discharging was performed, constant current discharging was performed until a termination voltage at a current of 0.1 C reached 3.0 V. An initial charge and discharge capacity for each active material weight was obtained by dividing the obtained initial charge and discharge capacity by the active material weight included in the electrode used.

Table 1 shows configurations and evaluation results of the positive electrode active materials of Examples 1 to 3, and Comparative Examples 1 to 4.

the electrolyte solution, and metal elution from the single-layer-covered composite particle into the electrolyte solution occurred. Accordingly, a cycle characteristic deteriorated.

In Comparative Example 2, since the core particle had low crystallinity, even when a surface of the first covering layer was covered by the second covering layer, metal elution from an inside of the core particle into the electrolyte solution occurred due to solid phase diffusion. Accordingly, a cycle characteristic deteriorated.

In Comparative Example 3, since the first covering layer had high crystallinity, it was not possible to mitigate distortion of lattices and crystallites within the core particles occurring due to a Li insertion and separation reaction necessary for phase transition. Accordingly, a cycle characteristic deteriorated.

In Comparative Example 4, since the core particle and the first covering layer had different configuration materials, it was not possible to mitigate distortion of lattices and crystallites within the core particles occurring due to a Li insertion and separation reaction necessary for phase transition. Accordingly, a cycle characteristic deteriorated.

In Examples 1 to 3 in which the core particles had high crystallinity and the first covering layer had low crystallinity, a peak intensity ratio E/A of the positive electrode active material in Raman spectra satisfied a relation of $0.1 \leq E/A \leq 0.35$. On the other hand, in Comparative Example 2 in

TABLE 1

| | Crystallinity of core particle | Crystallinity of first covering layer | Composition (core particle/first covering layer) | Composition of second covering layer | Crystallinity of second covering layer | Core particle E/A | Positive electrode active material E/A | 4.55 V initial charge capacity [mAh/g] | 4.55 V initial discharge capacity [mAh/g] | 4.55 V charge and discharge efficiency [%] | Capacity retention rate after 100 cycles [%] |
|---|---|---|---|---|---|---|---|---|---|---|---|
| Example 1 | High crystallillity | Low crystallillity | $LiCoO_2/LiCoO_2$ | $LiNi_{0.5}Co_{0.2}Mn_{0.3}O_2$ | High crystallillity | 0.45 | 0.12 | 260 | 243 | 93 | 81 |
| Example 2 | High crystallillity | Low crystallillity | $LiCoO_2/LiCoO_2$ | $LiNi_{0.5}Co_{0.2}Mn_{0.3}O_2$ | High crystallillity | 0.45 | 0.24 | 260 | 243 | 93 | 85 |
| Example 3 | High crystallillity | Low crystallillity | $LiCoO_2/LiCoO_2$ | $LiNi_{0.5}Co_{0.2}Mn_{0.3}O_2$ | High crystallillity | 0.45 | 0.33 | 260 | 238 | 92 | 83 |
| Comparative Example 1 | High crystallillity | Low crystallillity | $LiCoO_2/LiCoO_2$ | None | — | — | 0.32 | 276 | 212 | 77 | 65 |
| Comparative Example 2 | Low crystallillity | Low crystallillity | $LiCoO_2/LiCoO_2$ | $LiNi_{0.5}Co_{0.2}Mn_{0.3}O_2$ | High crystallillity | — | 0.08 | 265 | 206 | 78 | 62 |
| Comparative Example 3 | High crystallillity | High crystallillity | $LiCoO_2/LiCoO_2$ | $LiNi_{0.5}Co_{0.2}Mn_{0.3}O_2$ | High crystallillity | — | 0.36 | 255 | 211 | 83 | 45 |
| Comparative Example 4 | High crystallillity | Low crystallillity | $LiCoO_2/LiNi_{0.5}Co_{0.2}Mn_{0.3}O_2$ | $LiNi_{0.5}Co_{0.2}Mn_{0.3}O_2$ | High crystallillity | — | 0.22 | 265 | 209 | 79 | 52 |

The following can be understood from the above evaluation results.

In Examples 1 to 3, the lithium composite oxides included in the core particle and the first covering layer had the same composition, and the core particle had high crystallinity, and the first covering layer had low crystallinity. In addition, a surface of the low crystalline first covering layer was covered by the second covering layer. Thus, a high capacity and a favorable cycle characteristic were obtained.

In Comparative Example 1, since a surface of the first covering layer was not covered by the second covering layer, the low crystalline first covering layer came in contact with which both the core particles and the first covering layer had low crystallinity, a peak intensity ratio E/A in Raman spectra was E/A<0.1. In addition, in Comparative Example 3 in which both the core particles and the first covering layer had high crystallinity, a peak intensity ratio E/A in Raman spectra was 0.35<E/A.

In Examples 1 to 3, a peak intensity ratio E/A of the positive electrode active material (secondary particle powder) was lower than a peak intensity ratio E/A of core particles alone. This is because surfaces of the core particles having high crystallinity were covered by the covering layer having low crystallinity.

ii. Second Covering Material

Example 4

A positive electrode active material was obtained in the same manner as in Example 2 except that $Al_2O_3$ particle powder was used as a second covering material.

Example 5

A positive electrode active material was obtained in the same manner as in Example 2 except that MgO particle powder was used as a second covering material.

Example 6

A positive electrode active material was obtained in the same manner as in Example 2 except that NiO particle powder was used as a second covering material.

Example 7

A positive electrode active material was obtained in the same manner as in Example 2 except that $Mn_2O_3$ particle powder was used as a second covering material.

Example 8

A positive electrode active material was obtained in the same manner as in Example 2 except that $ZrO_2$ particle powder was used as a second covering material.

Example 9

A positive electrode active material was obtained in the same manner as in Example 2 except that $TiO_2$ particle powder was used as a second covering material.

Example 10

A positive electrode active material was obtained in the same manner as in Example 2 except that $B_2O_3$ particle powder was used as a second covering material.

Example 11

A positive electrode active material was obtained in the same manner as in Example 2 except that $WO_3$ particle powder was used as a second covering material.

Example 12

A positive electrode active material was obtained in the same manner as in Example 2 except that $Bi_2O_3$ particle powder was used as a second covering material.

Example 13

A positive electrode active material was obtained in the same manner as in Example 2 except that $P_2O_5$ particle powder was used as a second covering material.

Example 14

A positive electrode active material was obtained in the same manner as in Example 2 except that LiF particle powder was used as a second covering material.

Example 15

A positive electrode active material was obtained in the same manner as in Example 2 except that $LiMn_2O_4$ particle powder was used as a second covering material.

Example 16

A positive electrode active material was obtained in the same manner as in Example 2 except that $LiNi_{0.8}Co_{0.15}Al_{0.05}O_2$ particle powder was used as a second covering material.

Example 17

A positive electrode active material was obtained in the same manner as in Example 2 except that $LiNi_{0.33}Co_{0.33}Mn_{0.33}O_2$ particle powder was used as a second covering material.

Example 18

A positive electrode active material was obtained in the same manner as in Example 2 except that $LiFePO_4$ particle powder was used as a second covering material.

Example 19

A positive electrode active material was obtained in the same manner as in Example 2 except that $LiMn_{0.7}Fe_{0.3}PO_4$ particle powder was used as a second covering material.

Example 20

A positive electrode active material was obtained in the same manner as in Example 2 except that $Li_4Ti_5O_{12}$ particle powder was used as a second covering material.

Example 21

A positive electrode active material was obtained in the same manner as in Example 2 except that $Li_3PO_4$ particle powder was used as a second covering material.

Example 22

A positive electrode active material was obtained in the same manner as in Example 2 except that $MgF_2$ particle powder was used as a second covering material.

(Evaluation of Positive Electrode Active Materials)

Peak intensity ratios in Raman spectra and cycle characteristics of the positive electrode active materials of Examples 4 to 22 obtained as described above were evaluated in the same manner as in Examples 1 to 3, and Comparative Examples 1 to 4.

Table 2 shows configurations and evaluation results of the positive electrode active materials of Examples 2, and 4 to 22.

TABLE 2

| | Crystallinity of core particle | Crystallinity of first covering layer | Composition (core particle/first covering layer) | Composition of second covering layer | Crystallinity of second covering layer | E/A | Capacity retention rate after 100 cycles [%] |
|---|---|---|---|---|---|---|---|
| Example 2 | High crystallinity | Low crystallillity | $LiCoO_2$/$LiCoO_2$ | $LiNi_{0.5}Co_{0.2}Mn_{0.3}O_2$ | — | 0.24 | 85 |
| Example 4 | High crystallinity | Low crystallillity | $LiCoO_2$/$LiCoO_2$ | $Al_2O_3$ | — | 0.29 | 84 |
| Example 5 | High crystallinity | Low crystallillity | $LiCoO_2$/$LiCoO_2$ | $MgO$ | — | 0.24 | 84 |
| Example 6 | High crystallinity | Low crystallillity | $LiCoO_2$/$LiCoO_2$ | $NiO$ | — | 0.24 | 80 |
| Example 7 | High crystallinity | Low crystallillity | $LiCoO_2$/$LiCoO_2$ | $Mn_2O_3$ | High crystallinity | 0.25 | 86 |
| Example 8 | High crystallinity | Low crystallillity | $LiCoO_2$/$LiCoO_2$ | $ZrO_2$ | — | 0.25 | 84 |
| Example 9 | High crystallinity | Low crystallillity | $LiCoO_2$/$LiCoO_2$ | $TiO_2$ | — | 0.29 | 80 |
| Example 10 | High crystallinity | Low crystallillity | $LiCoO_2$/$LiCoO_2$ | $B_2O_3$ | — | 0.27 | 90 |
| Example 11 | High crystallinity | Low crystallillity | $LiCoO_2$/$LiCoO_2$ | $WO_3$ | — | 0.23 | 85 |
| Example 12 | High crystallinity | Low crystallillity | $LiCoO_2$/$LiCoO_2$ | $Bi_2O_3$ | — | 0.25 | 85 |
| Example 13 | High crystallinity | Low crystallillity | $LiCoO_2$/$LiCoO_2$ | $P_2O_5$ | — | 0.21 | 84 |
| Example 14 | High crystallinity | Low crystallillity | $LiCoO_2$/$LiCoO_2$ | $LiF$ | — | 0.27 | 84 |
| Example 15 | High crystallinity | Low crystallillity | $LiCoO_2$/$LiCoO_2$ | $LiMn_2O_4$ | High crystallinity | 0.27 | 84 |
| Example 16 | High crystallinity | Low crystallillity | $LiCoO_2$/$LiCoO_2$ | $LiNi_{0.8}Co_{0.15}Al_{0.05}O_2$ | High crystallinity | 0.24 | 83 |
| Example 17 | High crystallinity | Low crystallillity | $LiCoO_2$/$LiCoO_2$ | $LiNi_{0.33}Co_{0.33}Mn_{0.33}O_2$ | High crystallinity | 0.23 | 81 |
| Example 18 | High crystallinity | Low crystallillity | $LiCoO_2$/$LiCoO_2$ | $LiFePO_4$ | — | 0.21 | 87 |
| Example 19 | High crystallinity | Low crystallillity | $LiCoO_2$/$LiCoO_2$ | $LiMn_{0.7}Fe_{0.3}PO_4$ | — | 0.24 | 83 |
| Example 20 | High crystallinity | Low crystallillity | $LiCoO_2$/$LiCoO_2$ | $Li_4Ti_5O_{12}$ | — | 0.22 | 85 |
| Example 21 | High crystallinity | Low crystallillity | $LiCoO_2$/$LiCoO_2$ | $Li_3PO_4$ | — | 0.27 | 81 |
| Example 22 | High crystallinity | Low crystallillity | $LiCoO_2$/$LiCoO_2$ | $MgF_2$ | — | 0.21 | 83 |

The following can be understood from the above evaluation results.

Even when oxide particle powder or fluoride particle powder other than $LiNi_{0.5}Co_{0.2}Mn_{0.3}O_2$ particle powder was used as a material of the second covering layer, a favorable cycle characteristic can be obtained similarly to cases in which $LiNi_{0.5}Co_{0.2}Mn_{0.3}O_2$ particle powder was used as a material of the second covering layer.

In addition, while a specific initial charge and discharge capacity is not shown in Table 2, a high initial charge and discharge capacity was obtained also in Examples 4 to 22, similarly to Examples 1 to 3.

iii. Covering Amount of Second Covering Material

Example 23

A positive electrode active material was obtained in the same manner as in Example 2 except that single-layer-covered composite particle powder of 99.5 weight % and $LiNi_{0.5}Co_{0.2}Mn_{0.3}O_2$ particle powder of 0.5 weight % were formulated.

Example 24

A positive electrode active material was obtained in the same manner as in Example 2 except that single-layer-covered composite particle powder of 95 weight % and $LiNi_{0.5}Co_{0.2}Mn_{0.3}O_2$ particle powder of 5 weight % were formulated.

Example 25

A positive electrode active material was obtained in the same manner as in Example 2 except that single-layer-covered composite particle powder of 99.95 weight % and $LiNi_{0.5}CO_{0.2}Mn_{0.3}O_2$ particle powder of 00.5 weight % were formulated.

Example 26

A positive electrode active material was obtained in the same manner as in Example 2 except that single-layer-covered composite particle powder of 89 weight % and $LiNi_{0.5}CO_{0.2}Mn_{0.3}O_2$ particle powder of 11 weight % were formulated.

Example 27

A positive electrode active material was obtained in the same manner as in Example 4 except that single-layercovered composite particle powder of 99.8 weight % and $Al_2O_3$ particle powder of 0.2 weight % were formulated.

Example 28

A positive electrode active material was obtained in the same manner as in Example 4 except that single-layer-covered composite particle powder of 95 weight % and $Al_2O_3$ particle powder of 5 weight % were formulated.

Example 29

A positive electrode active material was obtained in the same manner as in Example 4 except that single-layer-covered composite particle powder of 99.95 weight % and $Al_2O_3$ particle powder of 0.05 weight % were formulated.

Example 30

A positive electrode active material was obtained in the same manner as in Example 4 except that single-layer-covered composite particle powder of 89 weight % and $Al_2O_3$ particle powder of 11 weight % were formulated.
(Evaluation of Positive Electrode Active Materials)

Cycle characteristics of the positive electrode active materials of Examples 23 to 30 obtained as described above were evaluated in the same manner as in Examples 1 to 3, and Comparative Examples 1 to 4.

Table 3 shows configurations and evaluation results of the positive electrode active materials of Examples 2, 4, and 23 to 30.

discharge capacity was obtained also in Examples 23 to 30, similarly to Examples 1 to 3.

iv. Core Particle and First Covering Material

Example 31

A positive electrode active material was obtained in the same manner as in Example 2 except that $Li_{0.9}CoO_2$ particle powder was used as a first covering material. In addition, the first covering material was prepared as follows.
[Process of Forming First Covering Material]

A cobalt oxide and lithium carbonate were mixed at a molar ratio (Li:Co) of 0.9:1 (an amount of Li:an amount of Co), calcined at 1000° C. for 6 hours in air, and quenched at room temperature, and thus low crystalline $Li_{0.9}CoO_2$ particle powder was obtained.

Example 32

A positive electrode active material was obtained in the same manner as in Example 2 except that $Li_{1.1}CoO_2$ particle powder was used as a first covering material. In addition, the first covering material was prepared as follows.
[Process of Forming First Covering Material]

A cobalt oxide and lithium carbonate were mixed at a molar ratio (Li:Co) of 1.1:1 (an amount of Li:an amount of Co), calcined at 1000° C. for 6 hours in air, and quenched at room temperature, and thus low crystalline $Li_{1.1}CoO_2$ particle powder was obtained 1.

TABLE 3

| | Crystallinity of core particle | Crystallinity of first covering layer | Composition (core particle/first covering layer) | Composition of second covering layer | Crystallinity of second covering layer | Covering amount (weight %) | Capacity retention rate after 100 cycles [%] |
|---|---|---|---|---|---|---|---|
| Example 2 | High crystallinity | Low crystallillity | $LiCoO_2/LiCoO_2$ | $LiNi_{0.5}Co_{0.2}Mn_{0.3}O_2$ | High crystallinity | 3 | 85 |
| Example 23 | High crystallinity | Low crystallillity | $LiCoO_2/LiCoO_2$ | $LiNi_{0.5}Co_{0.2}Mn_{0.3}O_2$ | High crystallinity | 0.5 | 81 |
| Example 24 | High crystallinity | Low crystallillity | $LiCoO_2/LiCoO_2$ | $LiNi_{0.5}Co_{0.2}Mn_{0.3}O_2$ | High crystallinity | 5 | 82 |
| Example 25 | High crystallinity | Low crystallillity | $LiCoO_2/LiCoO_2$ | $LiNi_{0.5}Co_{0.2}Mn_{0.3}O_2$ | High crystallinity | 0.05 | 72 |
| Example 26 | High crystallinity | Low crystallillity | $LiCoO_2/LiCoO_2$ | $LiNi_{0.5}Co_{0.2}Mn_{0.3}O_2$ | High crystallinity | 11 | 69 |
| Example 4 | High crystallinity | Low crystallillity | $LiCoO_2/LiCoO_2$ | $Al_2O_3$ | — | 3 | 84 |
| Example 27 | High crystallinity | Low crystallillity | $LiCoO_2/LiCoO_2$ | $Al_2O_3$ | — | 0.2 | 80 |
| Example 28 | High crystallinity | Low crystallillity | $LiCoO_2/LiCoO_2$ | $Al_2O_3$ | — | 5 | 87 |
| Example 29 | High crystallinity | Low crystallillity | $LiCoO_2/LiCoO_2$ | $Al_2O_3$ | — | 0.05 | 69 |
| Example 30 | High crystallinity | Low crystallillity | $LiCoO_2/LiCoO_2$ | $Al_2O_3$ | — | 11 | 72 |

The following can be understood from the above evaluation results.

When a ratio of the second covering material was set to 0.1 mol % or more and 10 mol % or less with respect to a total amount of the core particle, the first covering material, and the second covering material, it was possible to obtain a particularly favorable cycle characteristic.

In addition, while a specific initial charge and discharge capacity is not shown in Table 2, a high initial charge and Example 33

A positive electrode active material was obtained in the same manner as in Example 2 except that high crystalline $Li_{0.9}CoO_2$ particle powder was used as core particle powder. In addition, the core particle powder was prepared as follows.
[Process of Forming Core Particle Powder]

A cobalt oxide and lithium carbonate were mixed at a molar ratio (Li:Co) of 0.9:1 (an amount of Li:an amount of Co), calcined at 1000° C. for 6 hours in air, and gradually cooled, and thus high crystalline $Li_{0.9}CoO_2$ particle powder was obtained.

Example 34

A positive electrode active material was obtained in the same manner as in Example 2 except that high crystalline $Li_{1.1}CoO_2$ particle powder was used as core particle powder. In addition, the core particle powder was prepared as follows.
[Process of Forming Core Particle Powder]
A cobalt oxide and lithium carbonate were mixed at a molar ratio (Li:Co) of 1.1:1 (an amount of Li:an amount of Co), calcined at 1000° C. for 6 hours in air, and gradually cooled, and thus high crystalline $Li1.1CoO_2$ particle powder was obtained.

Example 35

A positive electrode active material was obtained in the same manner as in Example 2 except that high crystalline $LiCoO_{1.97}F_{0.03}$ particle powder was used as core particle powder, and low crystalline $LiCoO_{1.97}F_{0.03}$ particle powder was used as a first covering material. In addition, the core particle powder and the first covering material were prepared as follows.
[Process of Forming Core Particle Powder]
A cobalt oxide, lithium carbonate, and lithium fluoride were mixed at a molar ratio (Li:Co:F) of 1:1:0.03 (an amount of Li:an amount of Co:an amount of F), calcined at 1000° C. for 6 hours in air, and gradually cooled, and thus high crystalline $LiCoO_{1.97}F_{0.03}$ particle powder was obtained.
[Process of Forming First Covering Material]
A cobalt oxide, lithium carbonate, and lithium fluoride were mixed at a molar ratio (Li:Co:F) of 1:1:0.03 (an amount of Li:an amount of Co:an amount of F), calcined at 1000° C. for 6 hours in air, and quenched at room temperature, and thus low crystalline $LiCoO_{1.97}F_{0.03}$ particle powder was obtained.

Example 36

A positive electrode active material was obtained in the same manner as in Example 2 except that high crystalline $LiCo_{0.95}Mg_{0.05}O_2$ particle powder was used as core particle powder and low crystalline $LiCo_{0.95}Mg_{0.05}O_2$ particle powder was used as a first covering material. In addition, the core particle powder and the first covering material were prepared as follows.
[Process of Forming Core Particle Powder]
A cobalt oxide, lithium carbonate, and magnesium oxide were mixed at a molar ratio (Li:Co:Mg) of 1:0.95:0.05 (an amount of Li:an amount of Co:an amount of Mg), calcined at 1000° C. for 6 hours in air, and gradually cooled, and thus high crystalline $LiCo_{0.95}Mg_{0.05}O_2$ particle powder was obtained.
[Process of Forming Covering Material]
A cobalt oxide, lithium carbonate, and magnesium oxide were mixed at a molar ratio (Li:Co:Mg) of 1:0.95:0.05 (an amount of Li:an amount of Co:an amount of Mg), calcined at 1000° C. for 6 hours in air, and quenched at room temperature, and thus low crystalline $LiCo_{0.95}Mg_{0.05}O_2$ particle powder was obtained.

Example 37

A positive electrode active material was obtained in the same manner as in Example 2 except that high crystalline $LiCo_{0.95}Al_{0.05}O_2$ particle powder was used as core particle powder and low crystalline $LiCo_{0.95}Al_{0.05}O_2$ particle powder was used as a first covering material. In addition, the core particle powder and the first covering material were prepared as follows.
[Process of Preparing Core Particle Powder]
A cobalt oxide, lithium carbonate, and aluminum oxide were mixed at a molar ratio (Li:Co:Al) of 1:0.95:0.05 (an amount of Li:an amount of Co:an amount of Al), calcined at 1000° C. for 6 hours in air, and gradually cooled, and thus high crystalline $LiCo_{0.95}Al_{0.05}O_2$ particle powder was obtained.
[Process of Preparing First Covering Material]
A cobalt oxide, lithium carbonate, and aluminum oxide were mixed at a molar ratio (Li:Co:Al) of 1:0.95:0.05 (an amount of Li:an amount of Co:an amount of Al), calcined at 1000° C. for 6 hours in air, and quenched at room temperature, and thus low crystalline $LiCo_{0.95}Al_{0.05}O_2$ particle powder was obtained.

Example 38

A positive electrode active material was obtained in the same manner as in Example 2 except that high crystalline $LiCo_{0.95}Mn_{0.05}O_2$ particle powder was used as core particle powder and low crystalline $LiCo_{0.95}Mn_{0.05}O_2$ particle powder was used as a first covering material. In addition, the core particle powder and the first covering material were prepared as follows.
[Process of Forming Core Particle Powder]
A cobalt oxide, lithium carbonate, and a manganese oxide were mixed at a molar ratio (Li:Co:Mn) of 1:0.95:0.05 (an amount of Li:an amount of Co:an amount of Mn), calcined at 1000° C. for 6 hours in air, and gradually cooled, and thus high crystalline $LiCo_{0.95}Al_{0.05}O_2$ particle powder was obtained.
[Process of Forming First Covering Material]
A cobalt oxide, lithium carbonate, and a manganese oxide were mixed at a molar ratio (Li:Co:Mn) of 1:0.95:0.05 (an amount of Li:an amount of Co:an amount of Mn), calcined at 1000° C. for 6 hours in air, and quenched at room temperature, and thus low crystalline $LiCo_{0.95}Mn_{0.05}O_2$ particle powder was obtained.

Example 39

A positive electrode active material was obtained in the same manner as in Example 2 except that high crystalline $LiCo_{0.95}Ni_{0.05}O_2$ particle powder was used as core particle powder, and low crystalline $LiCo_{0.95}Ni_{0.05}O_2$ particle powder was used as a first covering material. In addition, the core particle powder and the first covering material were prepared as follows.
[Process of Forming Core Particle Powder]
A cobalt oxide, lithium carbonate, and nickel hydroxide were mixed at a molar ratio (Li:Co:Ni) of 1:0.95:0.05 (an amount of Li:an amount of Co:an amount of Ni), calcined at 1000° C. for 6 hours in air, and gradually cooled, and thus high crystalline $LiCo_{0.95}Ni_{0.05}O_2$ particle powder was obtained.
[Process of Forming First Covering Material]
A cobalt oxide, lithium carbonate, and nickel hydroxide were mixed at a molar ratio (Li:Co:Ni) of 1:0.95:0.05 (an amount of Li:an amount of Co:an amount of Ni), calcined at 1000° C. for 6 hours in air, and quenched at room temperature, and thus low crystalline $LiCo_{0.95}Ni_{0.05}O_2$ particle powder was obtained.

Example 40

A positive electrode active material was obtained in the same manner as in Example 2 except that high crystalline $LiNi_{0.5}Co_{0.2}Mn_{0.3}O_2$ particle powder was used as core particle powder and low crystalline $LiNi_{0.5}Co_{0.2}Mn_{0.3}O_2$ particle powder was used as a first covering material. In addition, the core particle powder and the first covering material were prepared as follows.
[Process of Forming Core Particle Powder]
A composite hydroxide of Ni, Mn, and Co and lithium carbonate were mixed at a molar ratio (Li:Ni:Co:Mn) of 10:5:2:3 (an amount of Li:an amount of Ni:an amount of Co:an amount of Mn), calcined at 900° C. for 6 hours in air, and gradually cooled, and thus high crystalline $LiNi_{0.5}Co_{0.2}Mn_{0.3}O_2$ particle powder was obtained.
[Process of Forming First Covering Material]
A composite hydroxide of Ni, Mn, and Co and lithium carbonate were mixed at a molar ratio (Li:Ni:Co:Mn) of 10:5:2:3 (an amount of Li:an amount of Ni:an amount of Co:an amount of Mn), calcined at 900° C. for 6 hours in air, and quenched at room temperature, and thus low crystalline $LiNi_{0.5}Co_{0.2}Mn_{0.3}O_2$ particle powder was obtained.

Example 41

A positive electrode active material was obtained in the same manner as in Example 2 except that high crystalline $LiNi_{0.33}Co_{0.33}Mn_{0.33}O_2$ particle powder was used as core particle powder, and low crystalline $LiNi_{0.33}Co_{0.33}Mn_{0.33}O_2$ particle powder was used as a first covering material. In addition, the core particle powder and the first covering material were prepared as follows.
[Process of Forming Core Particle Powder]
A composite hydroxide of Ni, Mn, and Co and lithium carbonate were mixed at a molar ratio (Li:Ni:Co:Mn) of 10:3.3:3.3:3.3 (an amount of Li:an amount of Ni:an amount of Co:an amount of Mn), calcined at 900° C. for 6 hours in air, and gradually cooled, and thus high crystalline $LiNi_{0.33}Co_{0.33}Mn_{0.33}O_2$ particle powder was obtained.
[Process of Forming First Covering Material]
A composite hydroxide of Ni, Mn, and Co and lithium carbonate were mixed at a molar ratio (Li:Ni:Co:Mn) of 10:3.3:3.3:3.3 (an amount of Li:an amount of Ni:an amount of Co:an amount of Mn), calcined at 900° C. for 6 hours in air, and quenched at room temperature, and thus low crystalline $LiNi_{0.33}Co_{0.33}Mn_{0.33}O_2$ particle powder was obtained.

Example 42

A positive electrode active material was obtained in the same manner as in Example 2 except that high crystalline $LiNi_{0.8}Co_{0.15}Al_{0.05}O_2$ particle powder was used as core particle powder and low crystalline $LiNi_{0.8}Co_{0.15}Al_{0.05}O_2$ particle powder was used as a first covering material. In addition, the core particle powder and the first covering material were prepared as follows.
[Process of Forming Core Particle Powder]
A composite hydroxide of Ni, Co, and Al and lithium carbonate were mixed at a molar ratio (Li:Ni:Co:Al) of 10:8.0:1.5:0.5 (an amount of Li:an amount of Ni:an amount of Co:an amount of Al), calcined at 900° C. for 6 hours under an oxygen atmosphere, and gradually cooled, and thus high crystalline $LiNi_{0.8}Co_{0.15}Al_{0.05}O_2$ particle powder was obtained.
[Process of Forming First Covering Material]
A composite hydroxide of Ni, Co, and Al and lithium carbonate were mixed at a molar ratio (Li:Ni:Co:Al) of 10:8.0:1.5:0.5 (an amount of Li:an amount of Ni:an amount of Co:an amount of Al), calcined at 900° C. for 6 hours under an oxygen atmosphere, and quenched at room temperature, and thus low crystalline $LiNi_{0.8}Co_{0.15}Al_{0.05}O_2$ particle powder was obtained.

Example 43

A positive electrode active material was obtained in the same manner as in Example 2 except that high crystalline $LiMn_2O_4$ particle powder was used as core particle powder and low crystalline $LiMn_2O_4$ particle powder was used as a first covering material. In addition, the core particle powder and the first covering material were prepared as follows.
[Process of Preparing Core Particle Powder]
A manganese hydroxide and lithium carbonate were mixed at a molar ratio (Li:Mn) of 1:2 (an amount of Li:an amount of Mn), calcined at 900° C. for 6 hours in air, and gradually cooled, and thus high crystalline $LiMn_2O_4$ particle powder was obtained.
[Process of Preparing First Covering Material]
A manganese hydroxide and lithium carbonate were mixed at a molar ratio (Li:Mn) of 1:2 (an amount of Li:an amount of Mn), calcined at 900° C. for 6 hours in air, and quenched at room temperature, and thus low crystalline $LiMn_2O_4$ particle powder was obtained.

(Evaluation of Positive Electrode Active Materials)

Cycle characteristics of the positive electrode active materials of Examples 31 to 43 obtained as described above were evaluated in the same manner as in Examples 1 to 3, and Comparative Examples 1 to 4.

Table 4 shows configurations and evaluation results of the positive electrode active materials of Examples 2, and 31 to 43.

TABLE 4

| | Crystallinity of core particle | Crystallinity of first covering layer | Composition of core particle | Composition of first covering layer | Composition of second covering layer | Capacity retention rate after 100 cycles [%] |
|---|---|---|---|---|---|---|
| Example 2 | High crystallinity | Low crystallillity | $LiCoO_2$ | $LiCoO_2$ | $LiNi_{0.5}Co_{0.2}Mn_{0.3}O_2$ | 85 |
| Example 31 | High crystallinity | Low crystallillity | $LiCoO_2$ | $Li_{0.9}CoO_2$ | $LiNi_{0.5}Co_{0.2}Mn_{0.3}O_2$ | 91 |

TABLE 4-continued

| | Crystallinity of core particle | Crystallinity of first covering layer | Composition of core particle | Composition of first covering layer | Composition of second covering layer | Capacity retention rate after 100 cycles [%] |
|---|---|---|---|---|---|---|
| Example 32 | High crystallinity | Low crystallillity | $LiCoO_2$ | $Li_{1.1}CoO_2$ | $LiNi_{0.5}Co_{0.2}Mn_{0.3}O_2$ | 92 |
| Example 33 | High crystallinity | Low crystallillity | $Li_{0.9}CoO_2$ | $LiCoO_2$ | $LiNi_{0.5}Co_{0.2}Mn_{0.3}O_2$ | 84 |
| Example 34 | High crystallinity | Low crystallillity | $Li_{1.1}CoO_2$ | $LiCoO_2$ | $LiNi_{0.5}Co_{0.2}Mn_{0.3}O_2$ | 82 |
| Example 35 | High crystallinity | Low crystallillity | $LiCoO_{1.97}F_{0.03}$ | $LiCoO_{1.97}F_{0.03}$ | $LiNi_{0.5}Co_{0.2}Mn_{0.3}O_2$ | 81 |
| Example 36 | High crystallinity | Low crystallillity | $LiCo_{0.95}Mg_{0.05}O_2$ | $LiCo_{0.95}Mg_{0.05}O_2$ | $LiNi_{0.5}Co_{0.2}Mn_{0.3}O_2$ | 83 |
| Example 37 | High crystallinity | Low crystallillity | $LiCo_{0.95}Al_{0.05}O_2$ | $LiCo_{0.95}Al_{0.05}O_2$ | $LiNi_{0.5}Co_{0.2}Mn_{0.3}O_2$ | 91 |
| Example 38 | High crystallinity | Low crystallillity | $LiCo_{0.95}Mn_{0.05}O_2$ | $LiCo_{0.95}Mn_{0.05}O_2$ | $LiNi_{0.5}Co_{0.2}Mn_{0.3}O_2$ | 91 |
| Example 39 | High crystallinity | Low crystallillity | $LiCo_{0.95}Ni_{0.05}O_2$ | $LiCo_{0.95}Ni_{0.05}O_2$ | $LiNi_{0.5}Co_{0.2}Mn_{0.3}O_2$ | 82 |
| Example 40 | High crystallinity | Low crystallillity | $LiNi_{0.5}Co_{0.2}Mn_{0.3}O_2$ | $LiNi_{0.5}Co_{0.2}Mn_{0.3}O_2$ | $LiNi_{0.5}Co_{0.2}Mn_{0.3}O_2$ | 89 |
| Example 41 | High crystallinity | Low crystallillity | $LiNi_{0.33}Co_{0.33}Mn_{0.33}O_2$ | $LiNi_{0.33}Co_{0.33}Mn_{0.33}O_2$ | $LiNi_{0.5}Co_{0.2}Mn_{0.3}O_2$ | 86 |
| Example 42 | High crystallinity | Low crystallillity | $LiNi_{0.8}Co_{0.15}Al_{0.05}O_2$ | $LiNi_{0.8}Co_{0.15}Al_{0.05}O_2$ | $LiNi_{0.5}Co_{0.2}Mn_{0.3}O_2$ | 85 |
| Example 43 | High crystallinity | Low crystallillity | $LiMn_2O_4$ | $LiMn_2O_4$ | $LiNi_{0.5}Co_{0.2}Mn_{0.3}O_2$ | 80 |

The following can be understood from the above evaluation results.

Even when lithium composite oxide particle powder other than $LiCoO_2$ particle powder was used as core particle powder and a first covering material, a favorable cycle characteristic can be obtained similarly to cases in which $LiCoO_2$ particle powder was used as core particle powder and a first covering material.

In addition, while a specific initial charge and discharge capacity is not shown in Table 4, a high initial charge and discharge capacity was obtained also in Examples 31 to 43, similarly to Examples 1 to 3.

v. Formation into Secondary Particle

Example 44

A process of preparing core particle powder, a process of preparing a first covering material, and a process of preparing a single-layer-covered composite particle were performed in the same manner as in Example 2, and thus single-layer-covered composite particle powder was obtained. Then, the composite particle powder was granulated and secondary particle powder including a plurality of composite particles was obtained. In addition, a process of preparing a second covering material was performed in the same manner as in Example 2, and thus $LiNi_{0.5}Co_{0.2}Mn_{0.3}O_2$ particle powder was obtained.

The obtained secondary particle powder of 97 weight % and $LiNi_{0.5}Co_{0.2}Mn_{0.3}O_2$ particle powder of 3 weight % were formulated and input into a high speed stirring and mixing device (Nobilta commercially available from Hosokawa Micron Group) that was one of high-speed rotary impact pulverizers. A treatment was performed for 10 minutes by rotating a rotor blade at 1000 rpm, and the $LiNi_{0.5}Co_{0.2}Mn_{0.3}O_2$ particle was deposited on a surface of the secondary particle, and thus single-layer-covered composite secondary particle powder was obtained. In this manner, a target positive electrode active material was obtained.

Comparative Example 5

A process of preparing core particle powder, a process of preparing a first covering material, and a process of preparing a single-layer-covered composite particle were performed in the same manner as in Example 2, and thus single-layer-covered composite particle powder was obtained. Then, the composite particle powder was granulated and surface-exposed composite secondary particle powder including a plurality of composite particles was obtained. In this manner, a target positive electrode active material was obtained.

(Evaluation of Positive Electrode Active Materials)

Cycle characteristics of the positive electrode active materials of the Example 44, and Comparative Example 5 obtained as described above were evaluated in the same manner as in Examples 1 to 3, and Comparative Examples 1 to 4.

Table 5 shows configurations and evaluation results of the positive electrode active materials of Examples 2 and 44, and Comparative Example 5.

TABLE 5

|  | Formation into secondary particle | Crystallinity of core particle | Crystallinity of first covering layer | Composition (core particle/ first covering layer) | Composition of second covering layer | Capacity retention rate after 100 cycles [%] |
|---|---|---|---|---|---|---|
| Example 2 | No | High crystallinity | Low crystallinity | $LiCoO_2$/ $LiCoO_2$ | $LiNi_{0.5}Co_{0.2}Mn_{0.3}O_2$ | 85 |
| Example 44 | Yes | High crystallinity | Low crystallinity | $LiCoO_2$/ $LiCoO_2$ | $LiNi_{0.5}Co_{0.2}Mn_{0.3}O_2$ | 96 |
| Comparative Example 5 | Yes | High crystallinity | Low crystallinity | $LiCoO_2$/ $LiCoO_2$ | None | 79 |

The following can be understood from the above evaluation results. When surface-covered composite secondary particle powder was used as a positive electrode active material, a cycle characteristic can be further improved than when 2-layer-covered composite primary particle powder was used as a positive electrode active material. On the other hand, when the surface-exposed composite secondary particle was used as a positive electrode active material, a cycle characteristic further deteriorated than when 2-layer-covered composite primary particle powder was used as a positive electrode active material.

In addition, while a specific initial charge and discharge capacity is not shown in Table 5, a high initial charge and discharge capacity was obtained also in Example 44, similarly to Examples 1 to 3.

Figure 17:
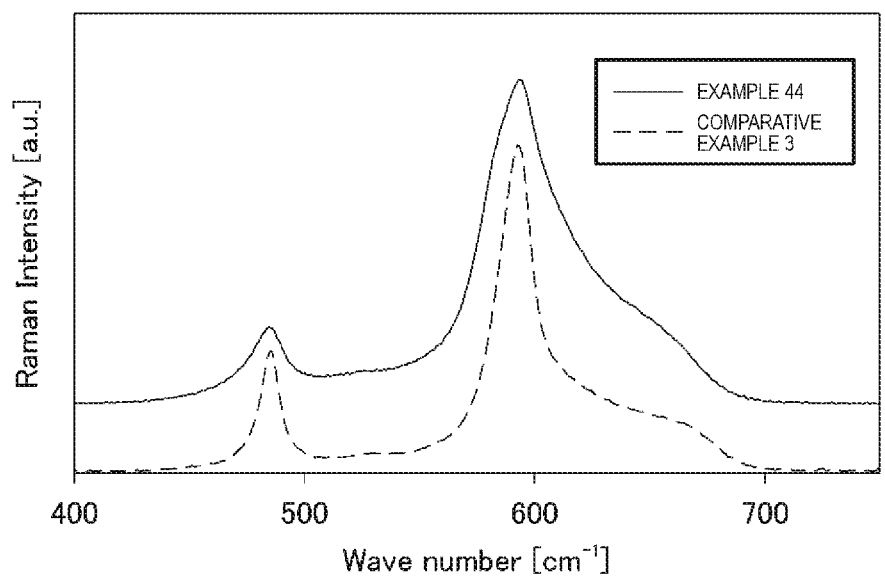
FIG. 17 is a diagram showing Raman spectra of positive electrode active materials of Example 44 and Comparative Example 3.

FIG. 17 shows Raman spectra of the positive electrode active materials of Comparative Example 3 and Example 44. In Comparative Example 3, since both the core particle and the first covering layer had high crystallinity, an intensity E of a peak in a range of 450 $cm^{-1}$ or more and 500 $cm^{-1}$ or less was great. On the other hand, in Example 44, while the covering layer of the secondary particle had high crystallinity, since the first covering layer had low crystallinity, an intensity E of a peak in a range of 450 $cm^{-1}$ or more and 500 $cm^{-1}$ or less was small.

The embodiments, variations thereof, and examples of the present technology have been specifically described above. However, the present technology is not limited to the above-described embodiments, variations thereof, and examples. Various modifications of the present technology can be made without departing from the technical spirit of the present technology.

For example, the configurations, the methods, the processes, the shapes, the materials, the numerical values, and the like mentioned in the above-described embodiments, variations thereof, and examples are merely examples. Different configurations, methods, processes, shapes, materials, numerical values, and the like may be used, as necessary.

Further, configuration, methods, processes, shapes, materials, numerical values and the like in the above-described embodiments, variations thereof, and examples may be combined insofar as they are not departing from the spirit of the present technology.

Additionally, the present technology may also be configured as below.

(1)

A positive electrode active material including:
a particle including a lithium composite oxide;
a first layer that is provided on a surface of the particle and includes a lithium composite oxide; and
a second layer that is provided on a surface of the first layer,
wherein the lithium composite oxide included in the particle and the lithium composite oxide included in the first layer have the same composition or almost the same composition,
the second layer includes an oxide or a fluoride, and
the lithium composite oxide included in the first layer has lower crystallinity than the lithium composite oxide included in the particle.

(2)

The positive electrode active material according to (1),
wherein, in Raman spectra, a peak intensity ratio E/A between an intensity A of a peak in a range of 550 $cm^{-1}$ or more and 650 $cm^{-1}$ or less and an intensity E of a peak in a range of 450 $cm^{-1}$ or more and 500 $cm^{-1}$ or less satisfies a relation represented by the following expression (1).

$$0.1 \le E/A \le 0.35. \quad (1)$$

(3)

The positive electrode active material according to (1) or (2),
wherein the oxide and the fluoride included in the second layer include at least one of Li, Ti, V, Cr, Mn, Fe, Co, Ni, Mn, Cu, Na, Mg, Al, Si, K, Ca, Zn, Ga, Sr, Y, Zr, Nb, Mo, Ba, La, W, Bi, P and B.

(4)

The positive electrode active material according to any of (1) to (3),
wherein the oxide included in the second layer is a lithium composite oxide.

(5)

The positive electrode active material according to any of (1) to (4),
wherein the lithium composite oxide included in the second layer has an average composition that is represented by the following expression (A).

$$Li_wM_xN_yO_{2-z}X_z \quad (A)$$

(where w is 0.8<w<1.2, x+y is 0.9<x+y<1.1, y is 0≤y<0.1, and z is 0≤z<0.05; M is at least one of Ti, V, Cr, Mn, Fe, Co, Ni, Mn and Cu; N is at least one of Na, Mg, Al, Si, K, Ca, Zn, Ga, Sr, Y, Zr, Nb, Mo, Ba, La, W and Bi; X is at least one of F, Cl and S)

(6)

The positive electrode active material according to any of (1) to (5),
wherein the second layer has an amount whose ratio is 0.1 mol % or more and 10 mol % or less with respect to a total amount of the particle, the first layer, and the second layer.

(7)

The positive electrode active material according to any of (1) to (6), wherein the lithium composite oxide included in the particle has an average composition that is represented by the following expression (B).

(where w is $0.8<w<1.2$, x+y is $0.9<x+y<1.1$, y is $0\leq y<0.1$, and z is $0\leq z<0.05$; M is at least one of Ti, V, Cr, Mn, Fe, Co, Ni, Mn and Cu; N is at least one of Na, Mg, Al, Si, K, Ca, Zn, Ga, Sr, Y, Zr, Nb, Mo, Ba, La, W and Bi; X is at least one of F, Cl and S).

(8)

The positive electrode active material according to any of (1) to (6), wherein the lithium composite oxide included in the particle has an average composition that is represented by the following expression (C).

(where x is $0.8<x<1.2$, y is $0\leq y<0.15$, and z is $0\leq z<0.05$; M is at least one of Ti, V, Cr, Mn, Fe, Ni, Mn, Cu, Na, Mg, Al, Si, K, Ca, Zn, Ga, Sr, Y, Zr, Nb, Mo, Ba, La and W; X is at least one of F, Cl and S).

(9)

A positive electrode including the positive electrode active material according to any of (1) to (8).

(10)

A battery including the positive electrode according to (9).

(11)

A battery pack including:

the battery according to (10).

(12)

An electronic device including:

the battery according to (10), wherein the electronic device receives power supply from the battery.

(13)

An electric vehicle including:

the battery according to (10);

a conversion device configured to perform conversion into driving power of the vehicle upon reception of power supply from the battery; and a control device configured to perform information processing regarding vehicle control based on information regarding the battery.

(14)

A power storage device including:

the battery according to (10), wherein the power storage device supplies power to an electronic device connected to the battery.

(15)

The power storage device according to (14), including:

a power information control device configured to transmit and receive a signal to and from another device via a network, wherein the power storage device performs charge/discharge control of the battery based on information received by the power information control device.

(16)

A power system including:

the battery according to (10), wherein the power system receives power supply from the battery, or allows power to be supplied to the battery from a power generation apparatus or a power network.

REFERENCE SIGNS LIST 11 battery can
12, 13 insulator plate
14 battery lid
15 safety valve mechanism
15A disc plate
16 positive temperature coefficient element
17 gasket
20 wound electrode body
21 positive electrode
21A positive electrode current collector
21B positive electrode active material layer
22 negative electrode
22A negative electrode current collector
22B negative electrode active material layer
23 separator
24 center pin
25 positive electrode lead
26 negative electrode lead It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A positive electrode active material comprising:
a particle including a lithium composite oxide;
a first layer that is provided on a surface of the particle and includes a lithium composite oxide; and
a second layer that is provided on a surface of the first layer,
wherein the lithium composite oxide included in the particle and the lithium composite oxide included in the first layer have the same constituent elements and the same atomic ratio or a difference between atomic ratios of the constituent elements of the core particles and the first covering layer is within 10 atom %,
the second layer includes an oxide or a fluoride, and
the lithium composite oxide included in the first layer has lower crystallinity than the lithium composite oxide included in the particle.

2. The positive electrode active material according to claim 1,
wherein, in Raman spectra, a peak intensity ratio E/A between an intensity A of a peak in a range of 550 cm$^{-1}$ or more and 650 cm$^{-1}$ or less and an intensity E of a peak in a range of 450 cm$^{-1}$ or more and 500 cm$^{-1}$ or less satisfies a relation represented by the following expression (1)

$$0.1<E/A<0.35 \qquad (1).$$

3. The positive electrode active material according to claim 1,
wherein the oxide and the fluoride included in the second layer include at least one of Li, Ti, V, Cr, Mn, Fe, Co, Ni, Mn, Cu, Na, Mg, Al, Si, K, Ca, Zn, Ga, Sr, Y, Zr, Nb, Mo, Ba, La, W, Bi, P and B.

4. The positive electrode active material according to claim 3,
wherein the oxide included in the second layer is a lithium composite oxide.

5. The positive electrode active material according to claim 4, wherein the lithium composite oxide included in the second layer has an average composition that is represented by the following expression (A)

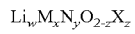 (A)

(where w is $0.8<w<1.2$, x+y is $0.9<x+y<1.1$, y is $0\leq y\leq 0.1$, and z is $0\leq z<0.05$; M is at least one of Ti, V, Cr, Mn, Fe, Co, Ni, Mn and Cu; N is at least one of Na, Mg, Al, Si, K, Ca, Zn, Ga, Sr, Y, Zr, Nb, Mo, Ba, La, W and Bi; X is at least one of F, Cl and S).

6. The positive electrode active material according to claim 1,
wherein the second layer has an amount whose ratio is 0.1 mol % or more and 10 mol % or less with respect to a total amount of the particle, the first layer, and the second layer.

7. The positive electrode active material according to claim 1,
wherein the lithium composite oxide included in the particle has an average composition that is represented by the following expression (B)

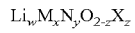 (B)

(where w is $0.8<w<1.2$, x+y is $0.9<x+y<1.1$, y is $0\leq y<0.1$, and z is $0\leq z<0.05$; M is at least one of Ti, V, Cr, Mn, Fe, Co, Ni, Mn and Cu; N is at least one of Na, Mg, Al, Si, K, Ca, Zn, Ga, Sr, Y, Zr, Nb, Mo, Ba, La, W and Bi; X is at least one of F, Cl and S).

8. The positive electrode active material according to claim 1,
wherein the lithium composite oxide included in the particle has an average composition that is represented by the following expression (C)

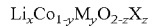 (C)

(where x is $0.8<x<1.2$, y is $0\leq y<0.15$, and z is $0\leq z<0.05$; M is at least one of Ti, V, Cr, Mn, Fe, Ni, Mn, Cu, Na, Mg, Al, Si, K, Ca, Zn, Ga, Sr, Y, Zr, Nb, Mo, Ba, La and W; X is at least one of F, Cl and S).

9. A positive electrode comprising:
a positive electrode active material that includes
a particle including a lithium composite oxide,
a first layer that is provided on a surface of the particle and includes a lithium composite oxide, and
a second layer that is provided on a surface of the first layer,
wherein the lithium composite oxide included in the particle and the lithium composite oxide included in the first layer have the same composition or a difference between atomic ratios of the constituent elements of the core particles and the first covering layer is within 10 atom %,
the second layer includes an oxide or a fluoride, and
the lithium composite oxide included in the first layer has lower crystallinity than the lithium composite oxide included in the particle.

10. A battery comprising:
a positive electrode including a positive electrode active material;
a negative electrode; and
an electrolyte,
wherein the positive electrode active material includes
a particle including a lithium composite oxide,
a first layer that is provided on a surface of the particle and includes a lithium composite oxide, and
a second layer that is provided on a surface of the first layer, and
wherein the lithium composite oxide included in the particle and the lithium composite oxide included in the first layer have the same composition or a difference between atomic ratios of the constituent elements of the core particles and the first covering layer is within 10 atom %,
the second layer includes an oxide or a fluoride, and
the lithium composite oxide included in the first layer has lower crystallinity than the lithium composite oxide included in the particle.

11. A battery pack comprising:
the battery according to claim 10.

12. An electronic device comprising:
the battery according to claim 10,
wherein the electronic device receives power supply from the battery.

13. An electric vehicle comprising:
the battery according to claim 10;
a conversion device configured to perform conversion into driving power of the vehicle upon reception of power supply from the battery; and
a control device configured to perform information processing regarding vehicle control based on information regarding the battery.

14. A power storage device comprising:
the battery according to claim 10,
wherein the power storage device supplies power to an electronic device connected to the battery.

15. The power storage device according to claim 14, comprising:
a power information control device configured to transmit and receive a signal to and from another device via a network,
wherein the power storage device performs charge/discharge control of the battery based on information received by the power information control device.

16. A power system comprising:
the battery according to claim 10,
wherein the power system receives power supply from the battery, or allows power to be supplied to the battery from a power generation apparatus or a power network.

* * * * *